US011233725B2

(12) United States Patent
Zhang et al.

(10) Patent No.: US 11,233,725 B2
(45) Date of Patent: Jan. 25, 2022

(54) CONVERGENCE LAYER FOR 5G COMMUNICATION SYSTEMS

(71) Applicant: APPLE INC., Cupertino, CA (US)

(72) Inventors: Yujian Zhang, Beijing (CN); Mo-Han Fong, Sunnyvale, CA (US); Candy Yiu, Portland, OR (US); Wey-Yi W. Guy, Beaverton, OR (US); Umesh Phuyal, Beaverton, OR (US); Youn Hyoung Heo, Seoul (KR)

(73) Assignee: Apple Inc., Cupertino, CA (US)

( * ) Notice: Subject to any disclaimer, the term of this patent is extended or adjusted under 35 U.S.C. 154(b) by 57 days.

(21) Appl. No.: 15/745,890

(22) PCT Filed: Dec. 21, 2015

(86) PCT No.: PCT/US2015/067077
§ 371 (c)(1),
(2) Date: Jan. 18, 2018

(87) PCT Pub. No.: WO2017/014802
PCT Pub. Date: Jan. 26, 2017

(65) Prior Publication Data
US 2018/0227219 A1 Aug. 9, 2018

Related U.S. Application Data

(60) Provisional application No. 62/195,620, filed on Jul. 22, 2015.

(51) Int. Cl.
*H04L 12/707* (2013.01)
*H04W 28/08* (2009.01)
(Continued)

(52) U.S. Cl.
CPC ............ *H04L 45/22* (2013.01); *H04L 47/34* (2013.01); *H04W 28/0273* (2013.01);
(Continued)

(58) Field of Classification Search
CPC ...... H04L 45/22; H04L 47/34; H04W 28/085; H04W 80/02; H04W 28/0273; H04W 36/0069; H04W 88/06; H04W 36/0066
See application file for complete search history.

(56) References Cited

U.S. PATENT DOCUMENTS

2003/0012192 A1* 1/2003 Dore ................... H04L 12/56
370/389
2003/0078063 A1* 4/2003 Legallais .......... H04L 12/40065
455/509

(Continued)

FOREIGN PATENT DOCUMENTS

EP 2835925 A1 2/2015

OTHER PUBLICATIONS

International Search Report dated Apr. 18, 2016 for International Application PCT/US2015/067077.

*Primary Examiner* — Gregory B Sefcheck
*Assistant Examiner* — Joshua Smith
(74) *Attorney, Agent, or Firm* — Eschweiler & Potashnik, LLC

(57) ABSTRACT

A network device (e.g., an evolved Node B (eNB), user equipment (UE) or the like) can operate to reduce an interruption time during a fallback operation resulting from a communication link blockage condition (e.g., a human blockage or other natural/physical wireless blockage). The network device includes a network convergence protocol (NCP) layer that enables communication between other network devices of different radio access technologies (RATs) in a heterogeneous network.

23 Claims, 14 Drawing Sheets

(51) Int. Cl.
*H04W 80/02* (2009.01)
*H04W 28/02* (2009.01)
*H04L 12/801* (2013.01)
*H04W 88/06* (2009.01)
*H04W 36/00* (2009.01)

(52) U.S. Cl.
CPC ......... *H04W 28/085* (2013.01); *H04W 80/02* (2013.01); *H04W 36/0066* (2013.01); *H04W 36/0069* (2018.08); *H04W 88/06* (2013.01)

(56) References Cited

U.S. PATENT DOCUMENTS

| | | | | |
|---|---|---|---|---|
| 2003/0123427 A1* | 7/2003 | Gaedke | ............ | H04N 21/43637 370/349 |
| 2003/0152100 A1* | 8/2003 | Gaedke | ............... | H04L 12/6418 370/442 |
| 2005/0249114 A1* | 11/2005 | Mangin | ................. | H04L 69/165 370/229 |
| 2009/0196252 A1* | 8/2009 | Fischer | ................. | H04L 1/0031 370/331 |
| 2010/0046549 A1* | 2/2010 | Heise | ................... | H04L 1/0001 370/474 |
| 2010/0165940 A1* | 7/2010 | Watfa | ....................... | H04W 8/08 370/329 |
| 2010/0195617 A1* | 8/2010 | Park | ....................... | H04W 36/02 370/331 |
| 2010/0240385 A1* | 9/2010 | Lohr | ................. | H04W 36/0072 455/452.2 |
| 2010/0265915 A1* | 10/2010 | Sun | ................... | H04W 36/0033 370/331 |
| 2012/0106406 A1* | 5/2012 | Xu | ........................ | H04L 47/624 370/280 |
| 2013/0003697 A1* | 1/2013 | Adjakple | .......... | H04W 36/0011 370/331 |
| 2013/0016696 A1* | 1/2013 | Adjakple | .............. | H04W 36/22 370/331 |
| 2013/0094552 A1* | 4/2013 | Vedantham | ........... | H04L 5/0062 375/222 |
| 2013/0107863 A1* | 5/2013 | Faccin | .............. | H04W 36/0022 370/331 |
| 2013/0189990 A1* | 7/2013 | Kim | ....................... | H04W 36/30 455/436 |
| 2013/0329694 A1* | 12/2013 | Vrzic | .................. | H04W 36/165 370/331 |
| 2014/0160950 A1 | 6/2014 | Vasudevan et al. | | |
| 2014/0198767 A1* | 7/2014 | Heo | .................... | H04W 36/023 370/331 |
| 2014/0198867 A1* | 7/2014 | Sturkovich | ............... | H04L 5/04 375/261 |
| 2014/0329526 A1* | 11/2014 | Sundararajan | .... | H04W 36/0066 455/436 |
| 2015/0023277 A1* | 1/2015 | Kim | ....................... | H04W 36/14 370/329 |
| 2015/0036593 A1* | 2/2015 | Uchino | ............. | H04W 36/0033 370/328 |
| 2015/0043435 A1* | 2/2015 | Blankenship | ......... | H04L 1/1874 370/329 |
| 2015/0043492 A1 | 2/2015 | Baek et al. | | |
| 2015/0063295 A1 | 3/2015 | Himayat et al. | | |
| 2015/0109997 A1* | 4/2015 | Sirotkin | .............. | H04L 65/1006 370/328 |
| 2015/0146614 A1* | 5/2015 | Yu | ..................... | H04W 28/0205 370/328 |
| 2015/0146617 A1* | 5/2015 | Park | ...................... | H04W 28/06 370/328 |
| 2015/0215987 A1* | 7/2015 | Kim | ........................ | H04L 47/34 370/329 |
| 2016/0212661 A1* | 7/2016 | Mallick | ................. | H04L 1/1614 |
| 2016/0262144 A1* | 9/2016 | Kitazoe | .............. | H04L 5/0057 |
| 2017/0026487 A1* | 1/2017 | Toth | .................... | H04L 12/6418 |
| 2017/0171897 A1* | 6/2017 | Ryu | ....................... | H04L 5/0044 |
| 2017/0280353 A1* | 9/2017 | Chauhan | .............. | H04W 28/06 |
| 2018/0020418 A1* | 1/2018 | Chandramouli | .... | H04W 60/005 |

* cited by examiner

CONVERGENCE LAYER FOR 5G COMMUNICATION SYSTEMS

REFERENCE TO RELATED APPLICATIONS

This application is a National Phase entry application of International Patent Application No. PCT/US2015/067077 filed on Dec. 21, 2015, which claims priority to U.S. Provisional Application 62/195,620 filed on Jul. 22, 2015, entitled "CONVERGENCE LAYER FOR 5G COMMUNICATION SYSTEMS" in the name of Yujian Zhang et al. and is hereby incorporated by reference in their entirety.

FIELD

The present disclosure relates to wireless communications, and more specifically, to a convergence protocol layer for wireless communications.

BACKGROUND

The fifth generation of mobile technology (5G) is positioned to address the demands and business contexts of 2020 and beyond. It has potential to enable a fully mobile and connected society and to empower socio-economic transformations in a countless number of ways, many of which are unimagined, including those for productivity, sustainability and well-being.

The new radio access technology (RAT) to be introduced for 5G can be deployed in a high frequency band, e.g. millimeter wave (mmW), ranging from about 30 GHz to about 300 GHz. In high frequency, it is possible that the channel condition between a wireless device (e.g., a user equipment (UE)) and a network can drop or lose connection suddenly due to blockage from building, vehicles, human movement, or other conditions. There can be two main types of blockage. One is channel condition or environment changes within a short time interval, which may last for tens of milliseconds. Additionally, human blockage can be another with a duration that can last several hundreds of milliseconds, for example, or more or less. Such long interruption time may cause transmission control protocol (TCP) connection to return to a slow start mode, which reduces the throughput perceived by the user, therefore impacting user throughput and quality of experience (QoE).

In 3GPP radio access network (RAN) long term evolution LTE systems, the node can be a combination of Evolved Universal Terrestrial Radio Access Network (E-UTRAN) Node Bs (also commonly denoted as evolved Node Bs, enhanced Node Bs, eNodeBs, or eNBs) and Radio Network Controllers (RNCs), which communicates with the UE. The downlink (DL) transmission can be a communication from the node (e.g., eNB) to the UE, and the uplink (UL) transmission can be a communication from the wireless device to the node. In LTE, data can be transmitted from the eNodeB to the UE via a physical downlink shared channel (PDSCH). A physical uplink control channel (PUCCH) can be used to acknowledge that data was received. Downlink and uplink channels can use time-division duplexing (TDD) or frequency-division duplexing (FDD).

DETAILED DESCRIPTION

Figure 1:
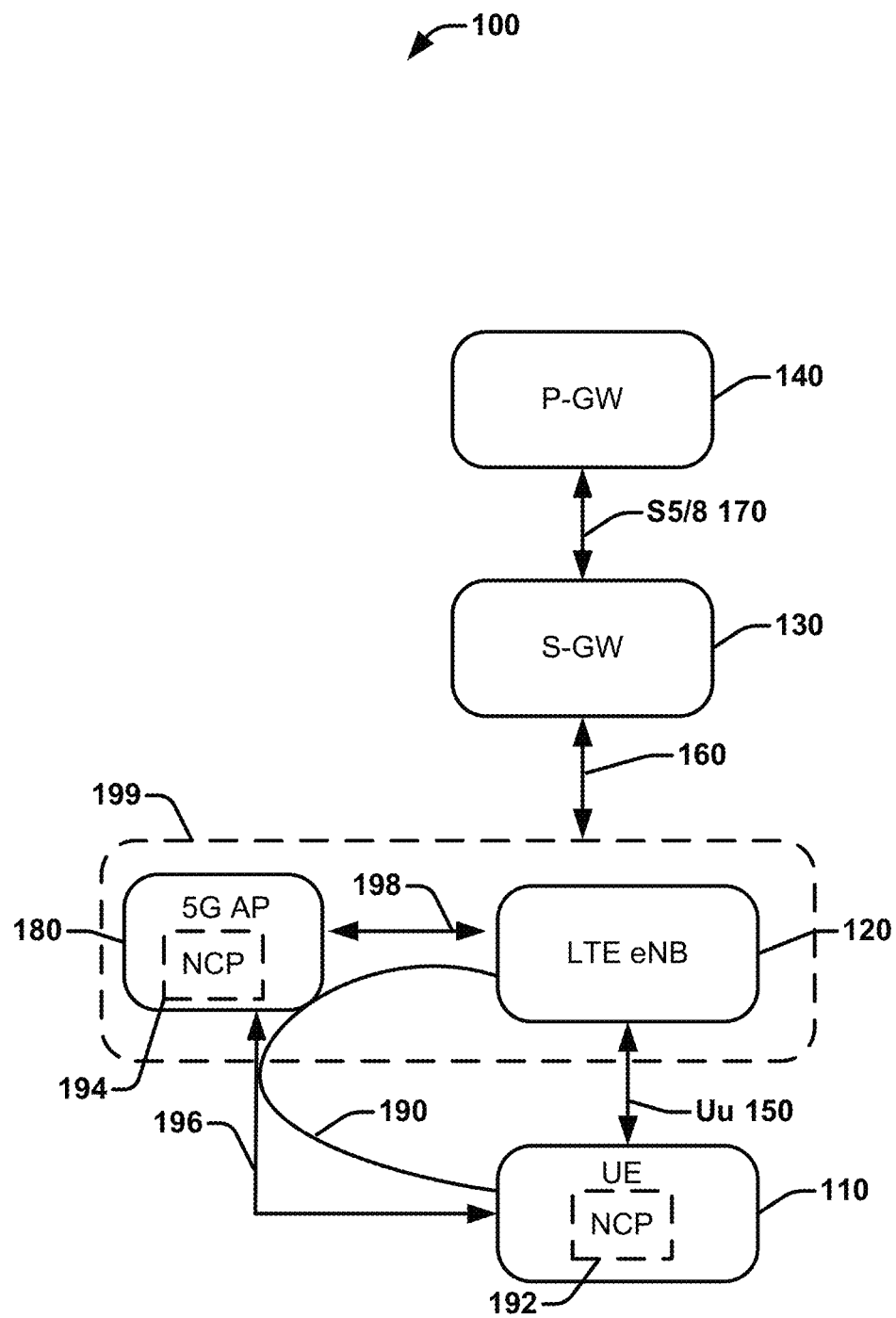
FIG. 1 illustrates a block diagram illustrating an example radio access network (RAN) anchored wireless local area network (WLAN) wireless communications network environment for a UE or eNB according to various embodiments.

The present disclosure will now be described with reference to the attached drawing figures, wherein like reference numerals are used to refer to like elements throughout, and wherein the illustrated structures and devices are not necessarily drawn to scale. As utilized herein, terms "component," "system," "interface," and the like are intended to refer to a computer-related entity, hardware, software (e.g., in execution), and/or firmware. For example, a component can be a processor, a process running on a processor, a controller, a circuit or a circuit element, an object, an executable, a program, a storage device, a computer, a tablet PC and/or a mobile phone with a processing device. By way of illustration, an application running on a server and the server can also be a component. One or more components can reside within a process, and a component can be localized on one computer and/or distributed between two or more computers. A set of elements or a set of other components can be described herein, in which the term "set" can be interpreted as "one or more."

Further, these components can execute from various computer readable storage media having various data structures stored thereon such as with a module, for example. The components can communicate via local and/or remote processes such as in accordance with a signal having one or more data packets (e.g., data from one component interacting with another component in a local system, distributed system, and/or across a network, such as, the Internet, a local area network, a wide area network, or similar network with other systems via the signal).

As another example, a component can be an apparatus with specific functionality provided by mechanical parts operated by electric or electronic circuitry, in which the electric or electronic circuitry can be operated by a software application or a firmware application executed by one or more processors. The one or more processors can be internal or external to the apparatus and can execute at least a part of the software or firmware application. As yet another example, a component can be an apparatus that provides specific functionality through electronic components or elements without mechanical parts; the electronic components can include one or more processors therein to execute software and/or firmware that confer(s), at least in part, the functionality of the electronic components.

Use of the word exemplary is intended to present concepts in a concrete fashion. As used in this application, the term "or" is intended to mean an inclusive "or" rather than an exclusive "or". That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more" unless specified otherwise or clear from context to be directed to a singular form. Furthermore, to the extent that the terms "including", "includes", "having", "has", "with", or variants thereof are used in either the detailed description and the claims, such terms are intended to be inclusive in a manner similar to the term "comprising".

In consideration of the above described deficiencies, various process and network devices are discloses to facilitate packet communications with a network convergence protocol (NCP) layer without having to utilizing bearer switching as a result of a fallback operation or other change from one serving access node (access point or network device (ND)) serving a UE. For example, such fallback operation can include changing the serving node from one radio access technology (RAT) (e.g., an LTE or 5GPP millimeter wave (mmW) to another (e.g., 5G mmW or other RAT) in response to various network conditions (e.g., blockage) that make the fallback target cell more optimal for the UE.

Communication in mmW spectrum has gained an increasing interest for tackling the spectrum crunch problem and meeting the high network capacity demand in 4G and beyond. Considering the channel characteristics of mmW bands, it can be fit into heterogeneous networks (HetNet) for boosting local-area data rate with a booster node together with at least one anchor node, as an anchor-booster based heterogeneous networks (HetNets) with mmW 5G capable booster cells.

In one example, a network device (e.g., an eNB, management entity, UE or any device communicatively coupled to a network) can be communicatively coupled to a multi-radio HetNet of a RAN. The multi-radio HetNet can comprise various multi-radio connections of various RATs, such as 3GPP, LTE, 5G, mmW, legacy 3GPP RATs via one or more NDs. The network device can comprise a NCP layer that operates to reduce interruption time from blockage events by controlling retransmissions, reordering processes, and duplicate elimination/discarding operations in response to fallback operations or processes.

The network device can include a memory with computer-executable components or instructions, and processing circuitry, communicatively coupled to the memory, which facilitates execution of the computer-executable components. The computer-executable components can include a receive logic component that receives, from a first layer (e.g., an upper or lower protocol layer), a first data unit or packet (e.g., a NCP protocol data unit (PDU) or a NCP service data unit (SDU)) that is associated with the NCP layer. The NCP layer can further control data unit/packet flow without bearer switching in response to fallback operations from a network device (e.g., an LTE or 5G anchor node or eNB) of the multi-radio heterogeneous network of the RAN. A control logic component can generate a second data unit associated with the NCP layer based on the first data unit. A transmit logic component can transmit the second data unit to a second layer (e.g., a lower or upper protocol layer) that is different from and opposite in protocol level than the first layer. For example, the upper layer can be an internet protocol (IP) layer and the lower layer a packet data convergence protocol PDCP. Additional aspects and details of the disclosure are further described below with reference to figures.

FIG. 1 illustrates a 3GPP RAN anchor-booster 5G network architectures 100 for LTE-5G aggregation in accordance with various aspects or embodiments being described.

The network architecture 100 can comprise an end-to-end network for cellular communications, including a UE 110, an eNB 120, and the following two gateway entities of an evolved packet core (EPC), or other network core, which are examples of network entities and can be extended to other network entities such as for 5G and beyond: a serving gateway (S-GW) 130 and a packet data network (PDN) gateway (PDN GW, or P-GW) 140, as well as other network entities or components, for example. One of ordinary skill in the art will recognize that an EPC can include other network entities and interfaces not further detailed such as for 5G networks or otherwise.

The UE 110 can communicate with the eNB 120 through an air interface Uu 150 (also referred to as a cellular link), which can comprise a wireless radio communication channel defined in 3GPP standards for long term evolution (LTE) wireless networks. The UE 110 can also operate as a dual connected device or dual radio UE 110 by being communicatively coupled to a 5G interface 196 or one or more other communication links/interfaces on the network concurrently or at the same time.

The S-GW 130, in communication with the eNB 120 through an interface 160 (e.g., an S1 or other interface), provides a point of interconnect between the wireless radio side and the EPC side of the network architecture 100, as a co-located or a non-collated eNB 120, in which "collocated" refers to the LTE AP (e.g., the eNB 120) being located in the same network device 199 or component as the 5G ND or AP 180. The interface 160 can also be connected separately and independently to both the LTE eNB 120 and the 5G AP 180. Network devices herein can be a gateway support node device, a cellular management entity device, a packet data gateway device, an eNB, for example, as well as other network devices functionally serving network communications for UEs and combinations of these devices communicatively coupled to one another.

The S-GW 130 can comprise the anchor point for the intra-LTE mobility, i.e., in case of a handover between eNBs and between LTE and other 3GPP accesses. The S-GW 130 is logically connected to the other gateway, the P-GW 140, through an S5/8 interface 170. 3GPP standards specify separately the S-GW 130 and the P-GW 140, but in practice, these gateways can be combined as a common network component provided by a network equipment vendor. The P-GW 140 further provides a point of interconnect between the EPC and an external internet protocol (IP) network (not shown). An external IP network is also called a packet data network (PDN). The P-GW 140 can route IP packets to and from PDNs.

In addition to the aforementioned end-to-end cellular network components, FIG. 1 further illustrates that the UE 110 can communicate with the eNB 120 through a 5G AP 180 via an interface 190, and can be connected to both the 5G AP 180 and the eNB 120 concurrently or simultaneously via interfaces 196 and 150, respectively. The interface 190 represents the operative network connection and protocols between the UE 110 and its associated LTE cellular base station (BS), the eNB 120. In other words, the interface 190 can be a logical interface that can be realized by a mmW point-to-point communication link between the UE 110 and the eNB 120 for routing the UE 110's cellular traffic (e.g., voice or data) via the 5G AP 180.

In one embodiment, the 5G AP 180 network device can comprise network convergence protocol (NCP) layer 194 while the UE device 110 can comprise an NCP layer 192. The NCP layers 194 or 192 can enable packet communications involving packet retransmission, reordering for out-of-sequence occurrences, or duplication removal/discard/elimination processes without having to utilize a different bearer as a result of a fallback operation from the LTE eNB 120 to the 5G AP 180, or vice versa.

In the 3GPP terminology, a bearer represents a class of traffic having a set of network parameters that establish a specific standard treatment for the traffic or data being communicated on the particular class of traffic (e.g., voice or the like) for one or more UEs or network devices (e.g., eNBs or the like). Bearers can be used to carry user plane traffic (i.e., user data) on an air interface, for example.

Fallback operations with 5G can occur in response to signal blockages, in which shorter wave mmW signals can be more susceptible to. Thus, for longer blockages call drops could occur more frequently. However, the NCP layers 194 or 192 can decrease the amount of interruption experienced by providing a specialized protocol layer in the communication processing that detects such blockages based on one or more criteria including any network condition or measurement related to the frequency band, network device operating (communicating) on the frequency band, or channel conditions, such as a signal strength, a channel quality, a load condition of the ND, or other parameter such as a reference signal received power (RSRP), a reference signal received quality (RSRQ), channel state information (CSI), one or more channel quality indicators (CQIs) or the like. In response to one or more criteria being satisfied according to a predetermined threshold, for example, a fallback operation can occur where the NCP layer 192, 194 operates at a receiving side and a transmitting side, either at different NDs (e.g., the UE 110, the 5G AP 180, the LTE eNB 120, or other ND), or within the receive and transmit side circuitry components of each ND. Depending on the deployment environment, LTE eNB 120 and 5G AP 180 new RAT can co-exist. The 3GPP interface can be used as the control and mobility anchor for the 5G link (e.g., 190 or 196), which can serve as an additional "carrier" within the 3GPP network and used for data offload. In one aspect, the interface link 198 can be a user plane or control plane protocol.

In one example, the LTE eNB 120 can be configured for coverage (i.e. mobility), while the 5G AP 180 RAT can be used for data offloading (as known as anchor-booster architecture). Other architectures or network configurations can also be envisioned also. For example, both anchor and booster node can be one or more 5G access nodes. For LTE-5G anchor booster architecture the bearer can be mapped to either the LTE eNB 120 or the 5G AP 180, where fallback to the LTE eNB would utilize explicit radio resource control (RRC) signaling to switch the bearer type, which could incur a long interruption time without the NCP layer 192 or 194 in operation.

Figure 2:
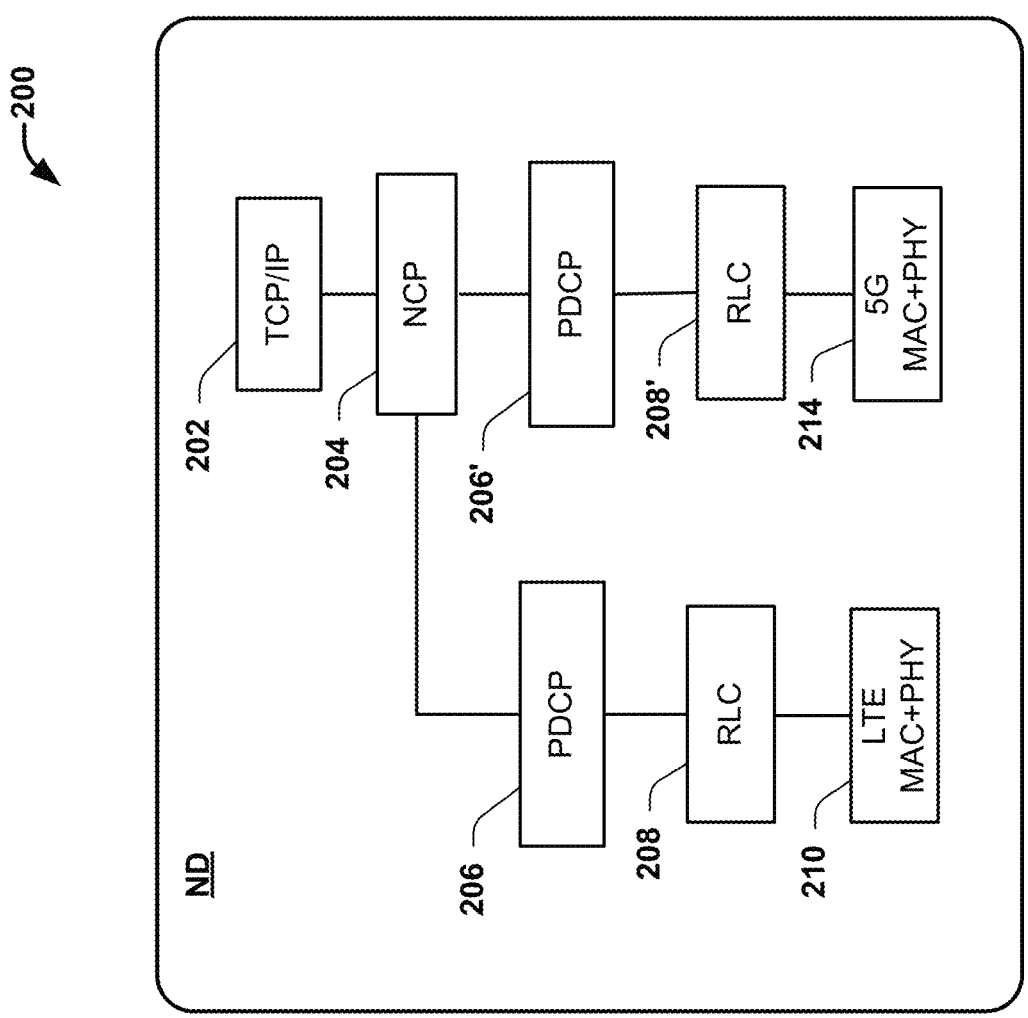
FIG. 2 illustrates an example network convergence protocol layer architecture applicable to the network environments, network devices (NDs) and processes according to various embodiments being disclosed.

Referring briefly to FIG. 2 before returning to FIG. 1, illustrated is an example network device 200 (e.g., a UE, a eNB of either 5G or LTE, or other ND) comprising a network convergence protocol layer for 5G communication system integration in accordance with various aspects. Embodiments herein relate to the NCP layer 204 to enable blockage issues that can occur in high frequency bands of 5G wireless systems. The NCP layer 204 can control packet retransmission/reordering/duplicate removal processes that result from the fallback between a 5G ND and an LTE ND, for example.

Different link aggregation architectures can be utilized with embodiments herein for enabling different communication links (e.g., 5G or LTE eNB or other communication links associated with different RATs). The TCP/IP layer 202 comprises a Transmission Control Protocol/Internet Protocol layers that is the basic communication language or protocol of the Internet, and can be used as a communications protocol in a private network (either an intranet or an extranet). The TCP/IP layer 202 facilitates communications protocols used to connect network devices on the Internet.

The NCP layer 204 can be utilized to meet demand for faster data rates and prevent the incurrence of long interruption times by blockages occurring over one or more 5G ND 180. The 5G ND 180 can be used for data offloading in order to alleviate or enable efficient load balancing on the network. By combining multiple channels at different frequencies and even different radio technologies or RATs (e.g., LTE and 5G mmW), the NCP layer 204 can operate on the DL or UL to facilitate traffic operations such as retransmissions, reordering, or duplicate discarding/elimination processes without bearer switching. This can enable fallback to other nodes, such as from the 5G ND 180 to another 5G AP coupled thereat or the LTE ND 120, for example.

The NCP layer 204 can be added can be added on top of or above one or more packet data convergence protocol (PDCP) layers 206, 206' (lower layer(s)) to perform IP packet retransmissions in either LTE eNB or another 5G node in case of blockage in one 5G node. It should be noted that the NCP layer 204 could also have other names, such as a Hyper Convergence Protocol (HCP), a Node Convergence Protocol (NCP), a Multi-Node Convergence Protocol (MNCP), a Multi-Node Flow Control (MNFC), and is not limited to any one particular name for converging a 5G ND communications with an LTE ND 120 or UE 110.

The Packet Data Convergence Protocol (PDCP) layer(s) 206, 206' residing below or lower than the NCP layer 204 can be one of the layers of the Radio Traffic Stack in LTE, UMTS and can perform IP header compression and decompression, transfer of user data and maintenance of sequence numbers for Radio Bearers.

The radio link control (RLC) layer(s) 208, 208' below or lower than the PDCP layer(s) 206, 206' can handle an automatic repeat request fragmentation protocol used over a wireless air interface. The RLC can detect packet losses and perform various other retransmissions aside from fall back conditions from a 5G node controlled by the NCP layer 204 to bring packet loss down to a low percentage rate, which is suitable for TCP/IP applications.

The physical (PHY) and MAC layers 210 and 214, corresponding to separate RATs respectively, can operate to provide an electrical, mechanical, and procedural interface to the transmission medium. The physical layer translates logical communications requests from the data link layer into hardware-specific operations to affect transmission or reception of electronic signals. The MAC sublayer provides addressing and channel access control mechanisms that make it possible for several terminals or network nodes to communicate within a multiple access network that incorporates a shared medium.

Figure 3:
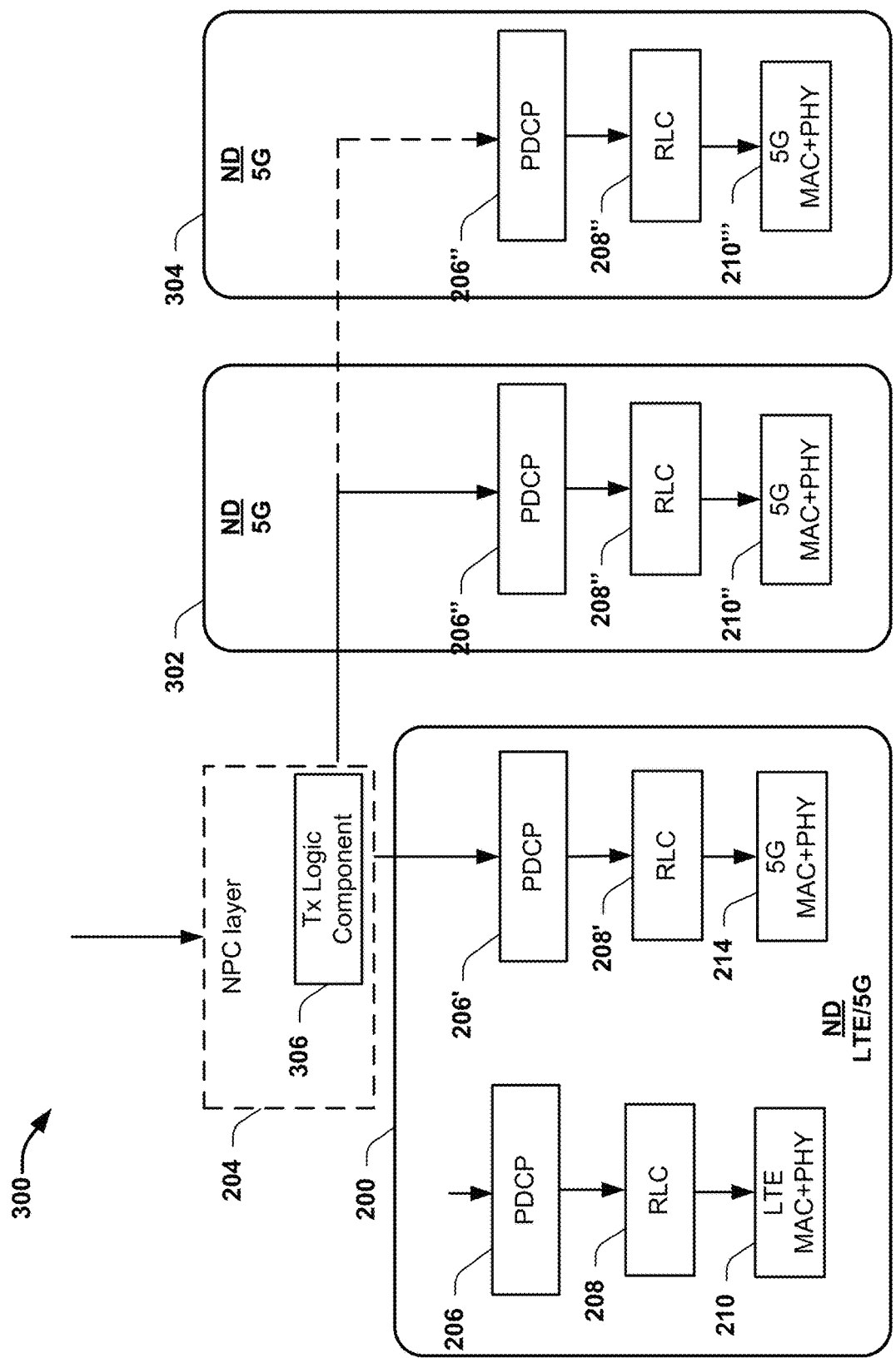
FIG. 3 illustrates a wireless communications network system with one or more NDs according to various embodiments.

FIG. 3 illustrates an example of a network 300 having various network devices (e.g., a UE, eNB of one or more of LTE/5G RATs). The network device 302 can be a serving node operating as a 5G mmW RAT node for downlinking data to a UE, for example. The network system 300 can utilize the NCP layer 204 for controlling fallback communications without bearer switching from a 5G mmW ND/node toward another 5G ND or LTE ND in response to a blockage being detected. The corresponding receiving side operation is further illustrated in FIG. 4. Embodiments relate to how the bearer/packet flow handled by 5G node 302 can be enabled to fallback to other nodes (e.g., the in case there is blockage experienced in the 5G ND 302.

In one aspect, the fallback operation can be performed in various directions such as towards the LTE or 5G ND 200, which can operate as the anchor node of the network 300. The fallback could also be performed towards another 5G node/ND 304. In this scenario, typically the 5G ND 304 can also be deployed in high frequency bands, and thus can provide similar throughput as 5G ND 302. The fallback operation could also be performed towards at least one of the LTE or 5G anchor node 200 and another 5G node (e.g., 5G ND 304).

In another aspect, the NCP layer 204 could comprise a transmit logic component 306 for transmitting one or more packet or data units to lower layers of the protocol stack. The transmit logic component 306 as well as the NCP layer 204 could reside as part of logic within the protocol stack as well as integrated in the logic circuitry (transceiver, transmitter or receiver circuitry) of a respective network device (e.g., UE, LTE eNB, 5G eNB, or otherwise). At the transmitting side, for example, the transmit logic component 402, in response to a reception of a NCP service data unit (SDU) from upper layers, process the NCP SDU and submit a resulting NCP layer PDU to a lower layer.

Figure 4:
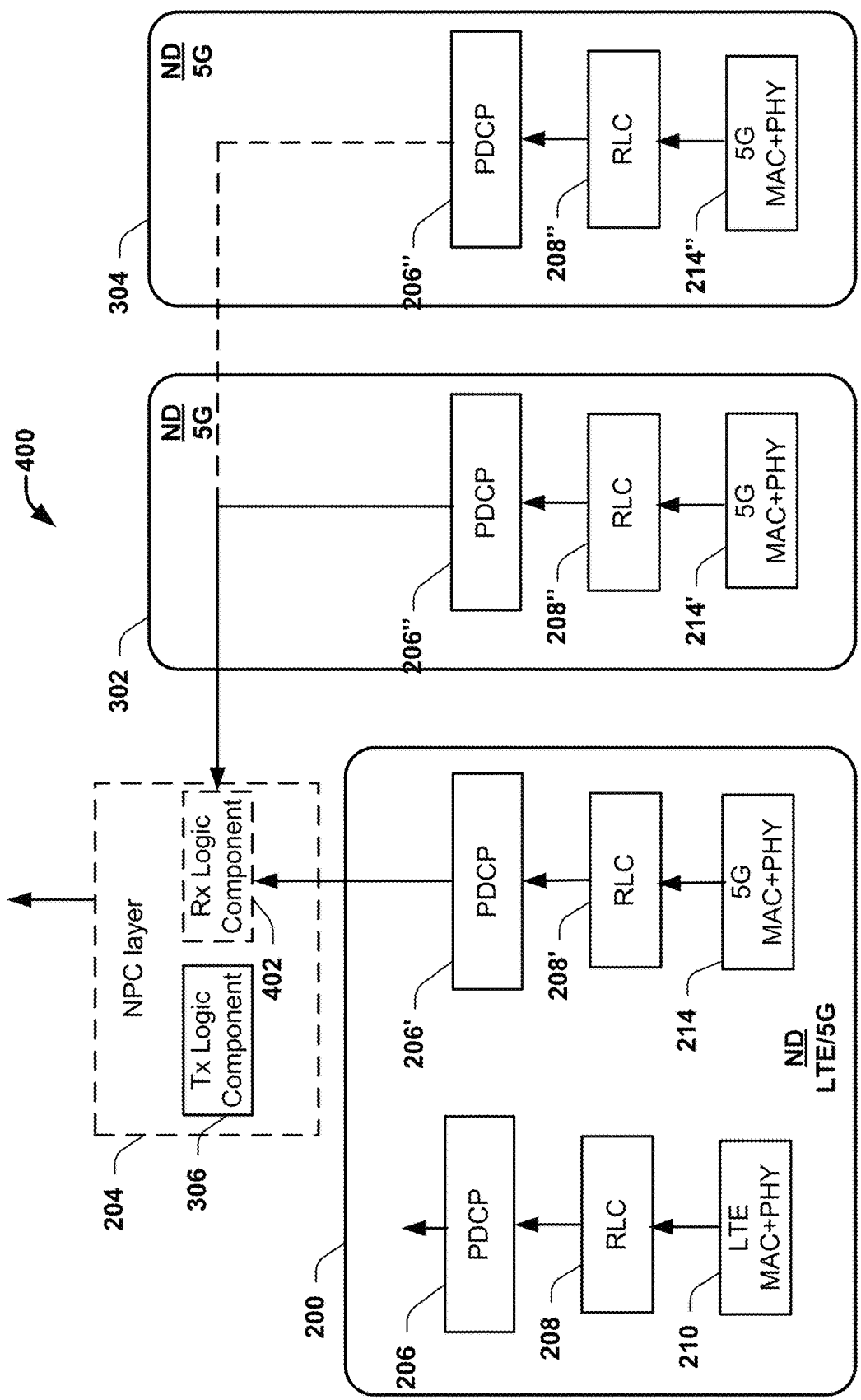
FIG. 4 illustrates another wireless communications network system with one or more NDs according to various embodiments.

In addition, FIG. 4 illustrates the NCP layer 204 comprising the transmit logic component 306 along with a receive logic component 402 for receiving and passing along packet or data units to upper or lower layers of the protocol stack. The receive logic component 402 can reside or operate at a receiving side, and in response to a reception of the NCP PDU from one or more lower layers, process the NCP PDU and deliver the resulting NCP layer SDU to an upper layer; in which as illustrated in FIG. 2 above, the upper layer 202 can be an Internet Protocol (IP) layer 202, and the lower layer can be PDCP layer 206 as a layer that resides immediately below the NCP layer 204.

Figure 5:
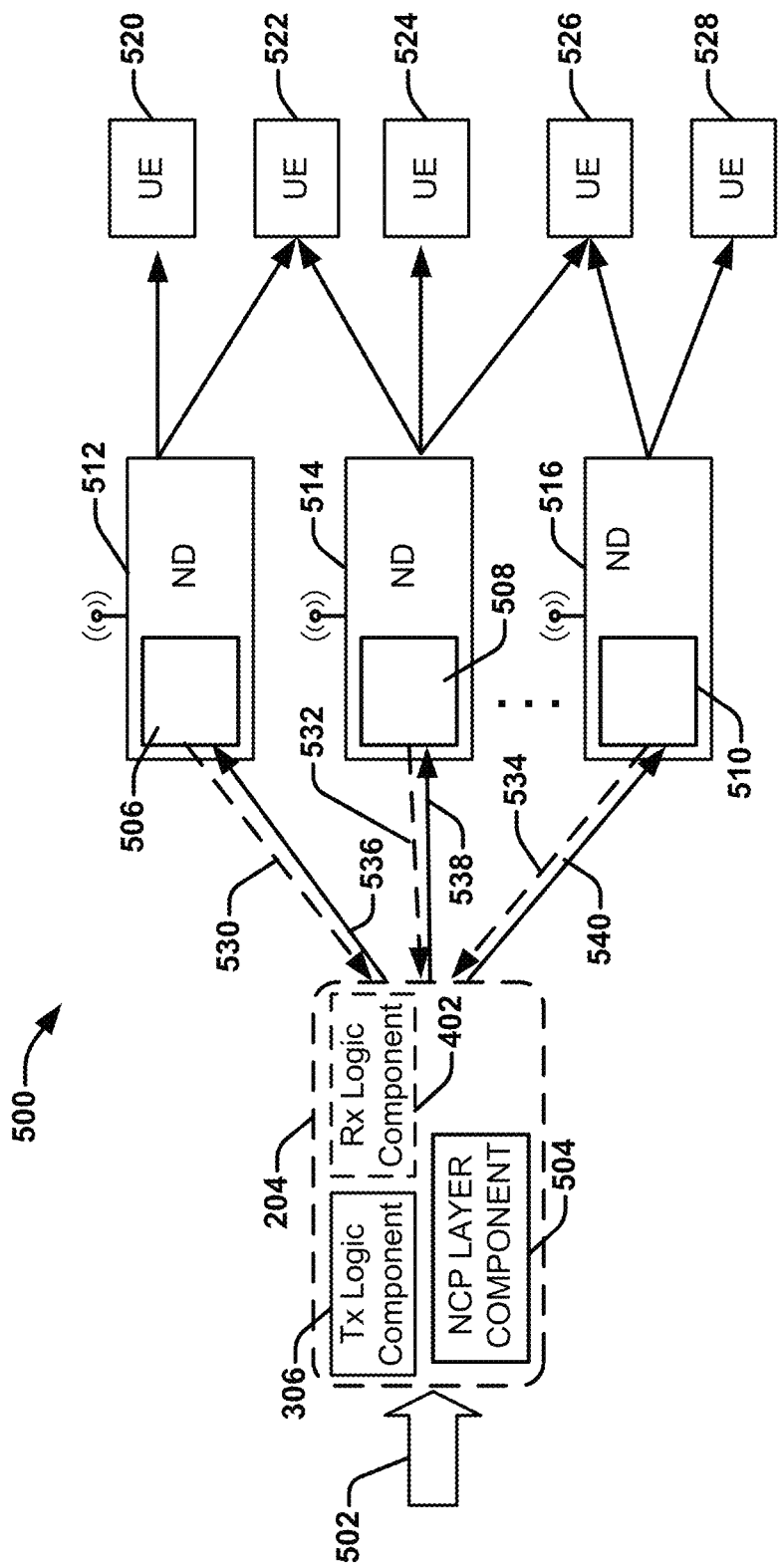
FIG. 5 illustrates another wireless communications network system with one or more NDs according to various embodiments.

Referring to FIG. 5, illustrates one example network system 500 for converging communications across different network device RATs. The network environment 500 comprises an NCP layer component 504 that receives data from various different network devices as data traffic 502 from UEs 520-528, data traffic via interfaces 530-540 from one or more APs, eNBs, or other network devices or components of one or more different RATs. Various other architectures can also be envisioned. For example, the NCP layer component 504 can include the TX logic component 306, and the RX logic component 204 as part of the NCP layer 204 across one or more NDs (e.g., eNBs, UEs or network entities).

The NCP layer component 504 can be a part of the NCP layer 204 or vice versa. The NCP layer component 504 can enable the network environment 500 to be delay aware by detecting blockage at a 5G mmW node (e.g., ND 512) and operating retransmission processes/reordering processes/duplication removal process and the like among network devices 512-516 and the UEs 520-528 as the result of a fallback from a detected blockage. The UE (e.g., 524 or otherwise) or the eNB 514 in connected mode or DL operations with the UE 524 can detect the blockage via a channel quality, SNR, a status report or other measurement or indication. For example, a status report can be sent to the eNB 514 via the UE 524 at regular scheduled intervals, based on an event trigger (e.g., low channel quality, SNR, low power, etc.) or be sent based on upon request from the eNB 514.

The network devices 512-516 can comprise one or more WLAN network devices, eNBs, small cell network devices, routers or other network devices of different RATs configured to communicate with the various UEs 520-528 within one or more network zones for communication and managing operations. The network device 512, for example, can comprise a 5G mmW ND 512 with a base station queue 506 for buffering traffic thereat. The network device 514, for example, can comprise another 5G mmW ND with a buffer/queue 508. Further, another network device 516 can comprise an LTE eNB or hybrid LTE/5G eNB anchor node with a base station queue 510. Likewise, one or more additional or alternative base station RATs can also be coupled to or comprise the NCP convergence layer 204 with traffic buffers or queues thereat for offloading and downlinking data for traffic flow.

Each UE 520-528 can be single or dual connected devices that are communicatively coupled to one or more communication links (e.g., license or unlicensed links) via one or more network devices or nodes (e.g., 5G 512 and eNB 516, or any other RAT network device) and can also be coupled to or comprise the NCP layer 204, for example. The network system 500 can include any number of base stations/access points/RATs across which the traffic can be converged for each UE 520-528 for fallback operations involving a switch between a 5G ND, an LTE/5G node 516 ND and another ND or node. Various processes can be executed by the NCP layer component 504, which can be located or reside at the eNB (e.g., 516) and other devices (e.g., NDs 512-514, and UEs 520-528) in cellular networks.

In one aspect, to enable dynamic fallback, the UEs 520-528 maintain the necessary parts related to the bearer (or IP data flow). For example, when fallback is performed towards the LTE/5G anchor node 512 from the 5G node 514 or other 5G ND 512 as a result of a blockage condition, the UE 520-528 can maintain or store layer 2 protocols (e.g. PDCP/RLC/MAC) corresponding to the LTE/5G anchor node, as well as layer 2 protocols corresponding to 5G ND 514.

Similarly, dynamic fallback without bearer mapping or switching can also be facilitated when fallback is performed towards another 5G node 512 from the 5G node 514 or other node. In this scenario, typically the 5G node 512 can also be deployed in high frequency bands, and thus, can provide similar throughput as 5G node 514 on which data was originally being offloaded, for example. The UE (e.g., 520-

528) can thus also keep, maintain or store the layer 2 protocols (e.g. PDCP/RLC/MAC) corresponding to 5G node 514, as well as layer 2 protocols corresponding to 5G node 512 to which fallback is toward.

In case of a blockage in 5G or at the 5G node (e.g., 5G mmW ND 514), when a UE (e.g., any of UEs 520-528) (as in the above described scenarios as well), in downlink communications, the LTE/5G eNB 516 being switched to in fallback can perform retransmission/new transmissions in the LTE part of eNB 516 (or from another 5G RAT node) directly without bearer switching or mapping of a different bearer via the NCP layer 204. Similarly for UL, a UE (e.g., any UE 520-528) also can perform retransmission/new transmissions in the LTE part within the same ND 516 (if a hybrid LTE/5G, or to another 5G RAT node) directly without bearer switching. The switching or fallback operations, for example, can also be either downlinked between 5G and LTE, or downlinked between different 5G nodes (e.g., 512 and 512). Cross bound/linked on the transmitter side (via transmit logic component 306) can also be the receive side (receive logic component 402), where all the received packets for retransmission/new transmissions in fallback mode or after fallback can go through the NCP layer 204.

Figure 6:
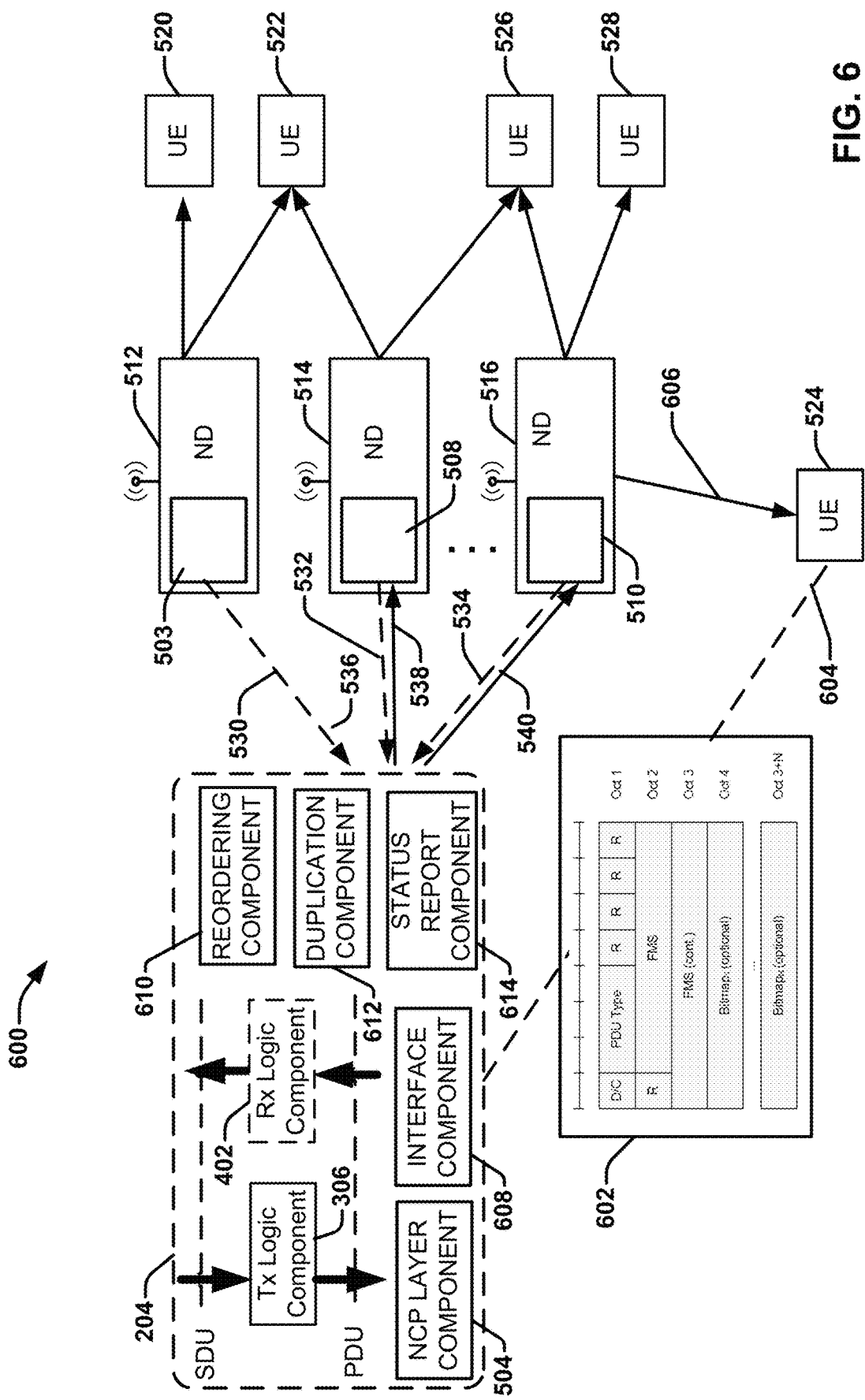
FIG. 6 illustrates another wireless communications network system for one or more NDs according to various embodiments.

Referring to FIG. 6, illustrated is another example of a network system 600 for converging communications across different network device RATs. (e.g., LTE/5G mmW) for retransmissions, reordering and duplication operations during or after a fallback due to blockage conditions. The NCP layer 204 can handle duplication operations or duplicate elimination/discarding operations also, as well as reordering operations where packets are received out of sequence or out of order, for example. The NCP layer 204 or NCP layer component 504 can further include an interface component 608, a reordering component 610, a duplication component and a status report component 614. As discussed above, the NCP layer component 504 can generate packet data based on different RATs, including a 5G millimeter wave RAT. The NCP layer component 504 can further generate a NCP layer PDU in response to receiving a NCP layer service data unit SDU, and in response to receiving the NCP layer PDU generate the NCP layer SDU.

For example, the transmit side logic component 306 (residing at the UE, eNB or other ND) can provide the NCP layer PDU to a lower protocol layer (e.g., PDCP/RLC/MAC) in response to obtaining the NCP layer SDU from an upper protocol layer (e.g., TCP/IP layer). In addition, the receive side logic component 402 (residing at the UE, eNB or other ND) can be configured to provide the NCP layer SDU to the upper protocol layer (e.g., TCP/IP layer) in response to obtaining the NCP layer PDU from the lower protocol layer (e.g., PDCP/RLC/MAC). The NCP layer component 504 is further configured to reduce an interruption time during a fallback operation without a bearer switching process from a first network device to a second network device, and communicate with the first network device and the second network device via different radio access technologies (RAT) in the multi-radio heterogeneous network of the RAN.

In one aspect, the status report component 608 can operate to generate or process a status report 602 via the NCP layer 204 as a NCP packet. The status report can be generated as a report on a PDU 602, for example, which can communicate one or more criteria including any network condition or measurement related to the UE frequency band, network device operating (communicating) on the frequency band, or channel conditions, such as a signal strength, a channel quality, a load condition of the ND, or other parameter such as a reference signal received power (RSRP), a reference signal received quality (RSRQ), channel state information (CSI), one or more channel quality indicators (CQIs) or the like.

The NCP layer component 504 or the status report component 614 as communicatively coupled to the NCP layer component, for example, can utilize the status report 602 to determine whether a fallback operation has in fact occurred on the network from a mmW node for offloading data operations between the network (e.g., 516) and the UE (e.g., 524). In response to one or more criteria satisfying a predetermined threshold, for example, the network devices can utilize a fallback operation. For example, the UE device 524 could no longer operating in a connected mode (or actively downlinking data or other communication) via the 5G mmW ND 514, as illustrated in FIG. 5 (via the connection between ND 514 and UE 524), but be switched (by a fallback operation) to being connected primarily between the LTE/5G mmW ND 516 (either at the LTE components/layers of the ND 516, or 5G mmW components/layers) for such communications via link 606.

In one example, the status report 602 can be explicitly transmitted via link 604 in the NCP layer 204 from receiving side to transmitting side (e.g., from the UE to the ND, via the transmit logic component 306 and the receive logic component 402). Alternatively, the status report 602 can be implicitly inferred by the NCP layer component 504 from the status report of lower layers (e.g., PDCP/RLC/MAC). In the latter case, one example is that receiving side (e.g., receiving logic component 402) at the UE 524 can indicate PDCP/RLC status report to transmitting side (e.g., transfer logic component 306) at the eNB (e.g., 514 or 516), and the transmitting side or the NCP layer component 504 can infer the missing NCP packets and perform retransmission accordingly.

In one embodiment, if the status report is transmitted, rather than inferred, the status report transmissions can be controlled in different ways. The status report 602, for example, could be communicated by the UE 524 at regular scheduled intervals, by an event trigger (e.g., low channel quality, SNR, low power, etc.) or be sent based on upon request from the eNB 514. For a periodic status report transmission, the period of status report transmission can be either fixed (e.g. status report is transmitted every 20 milliseconds), or the period can be configured/predetermined by higher layers, e.g. via RRC signaling. For example, if the data rate is very large (above a threshold), a dynamic configuration via the higher layers or the NCP layer component 504 can generate a large number, but if the number or data rate is very small (below a threshold), the receiver can send many status reports compared to the large data rate.

In the case where the status report transmission is requested by the transmitting side via transfer logic component 306, the status report 602 can be requested from the receiving side receiving logic component 402 at the UE 524 to provide the status report 602. Such request can be contained in the header of the NCP layer 204, or can be contained in RRC signaling, for example.

Additionally or alternatively, the status report 602 can be triggered by certain events. For example, when the receiving side has received at certain number of N PDUs, it can then send the status report 602. The number N can be either fixed (e.g. to 100), or N can be configured by higher layers, such as via RRC signaling. In another example or alternative, when the receiving side (e.g., the UE 534) or receive logic component 402 within the NCP layer 204 has received M bytes, then the status report measurement/communication can be configured. The number M can be either fixed (e.g. to 10,000,000, or otherwise) or it can be configured by higher layers, (e.g., via RRC signaling) as well.

Additionally or alternatively, the status report 602 can be triggered by a combination of above criteria. As an example, the status report 602 can be triggered and sent by the receiving side if N PDUs are received or 100 ms has elapsed since the last report, whichever happens first.

In any event, the status report 602 can be triggered by events related to fallback. As an example, if a link blockage is detected, (e.g., by means of continuous monitoring of DL pilot signals or by the receipt of PDU via a different radio), the receiving side can send the status report 602 as a result.

The status report 602 can include a NCP sequence number of a first missing NCP layer SDU (FMS) of a plurality of NCP layer SDUs, a bitmap indicating whether SDUs following the FMS of the plurality of NCP layer SDUs are successfully received, or a field of a NCP layer header indicating whether the NCP packet is a control NCP layer PDU or a data NCP layer PDU. A control NCP, for example can include control information such as address information, encapsulation or instructional data. The data PDU can include user/UE related data, for example.

In one example, the interface component 608 can operate to infer a sequence number from the lower protocol layer, or wherein the NCP layer component is further configured to transmit the sequence number in a NCP layer with the NCP layer SDU or the NCP layer PDU. The interface component can thus operate together with other components (e.g., the status report component 614, the reordering component 610, etc.) to facilitate inference data (e.g., sequence numbers of PDUs/SDUs) for the inference of missing PDUs/SDUs.

Sequence numbers can be explicitly transmitted in the NCP layer 201, or it can be implicitly inferred from lower layers via the inference component 608, for example. When the sequence number is implicitly inferred, it can be done, for example, by associating a one-to-one relationship between the NCP layer SDU with the corresponding PDCP layer SDU. Because there can be one sequence number (SN) for each PDCP SDU, the SN can be also used to denote the NCP layer SDU. At the receiving side, the interface facilitated by the interface component 608 between the PDCP layer (e.g., PDCP layer 206 of FIG. 2) and the NCP layer 204 can provide the PDCP SN to NCP layer 204.

In another embodiment, the reordering component 610 can generate a reordering process with NCP packets at the NCP layer 204 in response to one or more of the NCP packets being out-of-sequence or missing before a delivery of the NCP layer SDU to an upper protocol layer (e.g., TCP/IP layer). The missing packets can be determined or ascertained via the status report 602, for example. The sequence number (SN), for example, can be in a particular packet pattern, for example, which can be added to and identify a particular packet in a sequence of packets being communicated. It can also have other purposes, such as with retransmission. For example, the UE device 524 can communicate with the transmitter (e.g., transmit logic component 306) that a particular packet or sequence(s) of packets are lost by just providing an SN, either in the status report 602 or as a separate PDU communication. The transmitter 306 can then retransmit just this packet with this particular SN.

In an embodiment, in order to avoid packet loss during switching between different nodes, NCP layer 204 can retransmit NCP SDUs which have not been delivered successfully. The NCP layer 204 can figure out the undelivered NCP SDUs based on indication from PDCP/RLC of a concerned node or based on NCP layer status reports.

The duplication component 612 can operate to discard a duplicate NCP packet at the NCP layer 204 before the delivery of the NCP layer SDU to the upper protocol layer. In addition, the SN can be used to detect a duplication (e.g., a duplicate packet or transmission) via the duplication component 612. If a number or some particular SN is transmitted twice, then the duplication component 612 can operate to determine the duplication and discard the duplicate packet from the buffers or queues, for example, or allow for a release of the data from any queue or buffer.

In one embodiment, receiving side (e.g., receive logic component 402) of NCP layer 204 does not perform reordering or duplicate elimination/discard functions. This means that once the NCP layer 204 receives a packet from lower layers, it can pass to upper layer (e.g. IP layer) directly without any delay.

In another embodiment, receiving side of NCP layer can perform reordering and duplicate elimination/discard functions or operations via the duplication component 612 or the reordering component 610, for example. This means that once the NCP layer 204 receives a packet from lower layers, it can check whether the packet is a duplicate or not via the duplication component 614. The duplicated packet can then be discarded. Duplication could happen due to, for example, receiving the same packet through two or more links, or retransmissions due to false NACK or wrongly missing an ACK. In addition, if the received packet is out of order or out of sequence, it would not be delivered to upper layer until missing packets are received or some timer expires.

There are various processes by which the reordering and duplicate elimination/discard functions can be performed via the reordering component 610 and the duplication component 612. For example, either RLC UM-like or RLC AM-like approaches can be used for reordering via the reordering component 610. In both sets of processes, a window (or window sampling/reordering size) can be maintained as one of ordinary skill in the art can appreciate. The window size, for example, can be a size that is half of the sequence number space. For example, for 15 a bit NCP layer SN, the reordering window size can be 16384. For example, the size can be Maximum_NCP_SN=$2^N-1$, while N is the sequence number length and for a 15 bit sequence number, the Maximum_NCP_SN can be 32,767.

In RLC UM reordering processes, for example, a pull based model can be used where a new packet pulls the upper edge of the window forward. In RLC AM reordering processes, a push based model can be used where an in-order packet pushes the lower edge of the window forward.

The reordering component 610 can using RLC UM like processes for NCP layer 204 reordering by provide some changes (as compared with 3GPP TS 36.322 section 5.1.2.2 for RLC UM). For example, currently, the maximum SN size for RLC UM is 10 bit, and the window size is determined accordingly. Because the NCP layer 204 comprises a larger SN (e.g. 15 bit) that can be used, the reordering functionality can be modified to accommodate this change.

Further, in RLC UM, there is no transmitter window control, and thus to ensure lossless fallback, the reordering component 610 or duplication component 612 can further specify such transmitter window control. For example, the RLC AM window control (3GPP TS 36.322 section 5.1.3.1) for the NCP layer 204 can rely on the principle that the transmitter (e.g., transmit logic component 306) not bring more than half of the sequence space on the flight or communication processing (i.e. without the acknowledgement of successful reception). For example, for a 15 bit Convergence sequence number, the transmission window size can be 16384. The transmitting side of the NCP layer 204 thus will not deliver to lower layer any NCP layer data PDU whose SN falls outside of the transmitting window.

Referring to FIGS. 7-11, illustrated are an example protocol formats of PDUs that can be transmitted via the UE and eNB or another network device.

Figure 7:
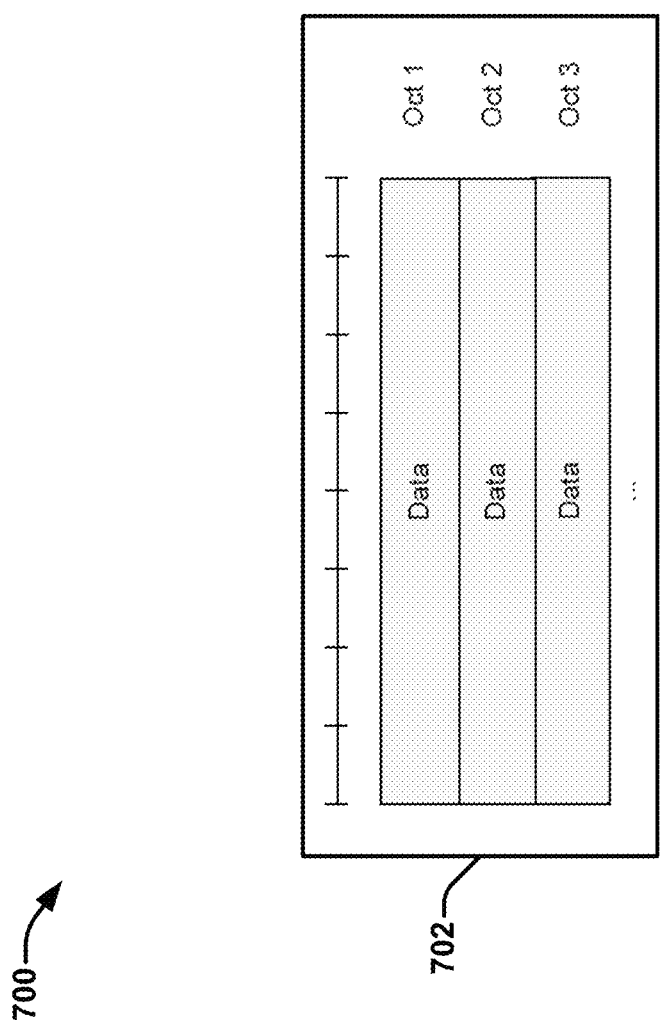
FIG. 7 illustrates an example packet data unit (PDU) format of a PDU according to various embodiments.

FIG. 7 illustrates a PDU 702 with one example PDU format 700 that can be implemented via the NCP layer 204. In this example format neither the SN nor the status report is explicitly transmitted in the NCP layer. This format can be a user plant data NCP PDU format for communication between the UE and other network devices at receiver and transmitter sides, or transmit and receive interfaces within the NCP layer, for example.

Figure 8:
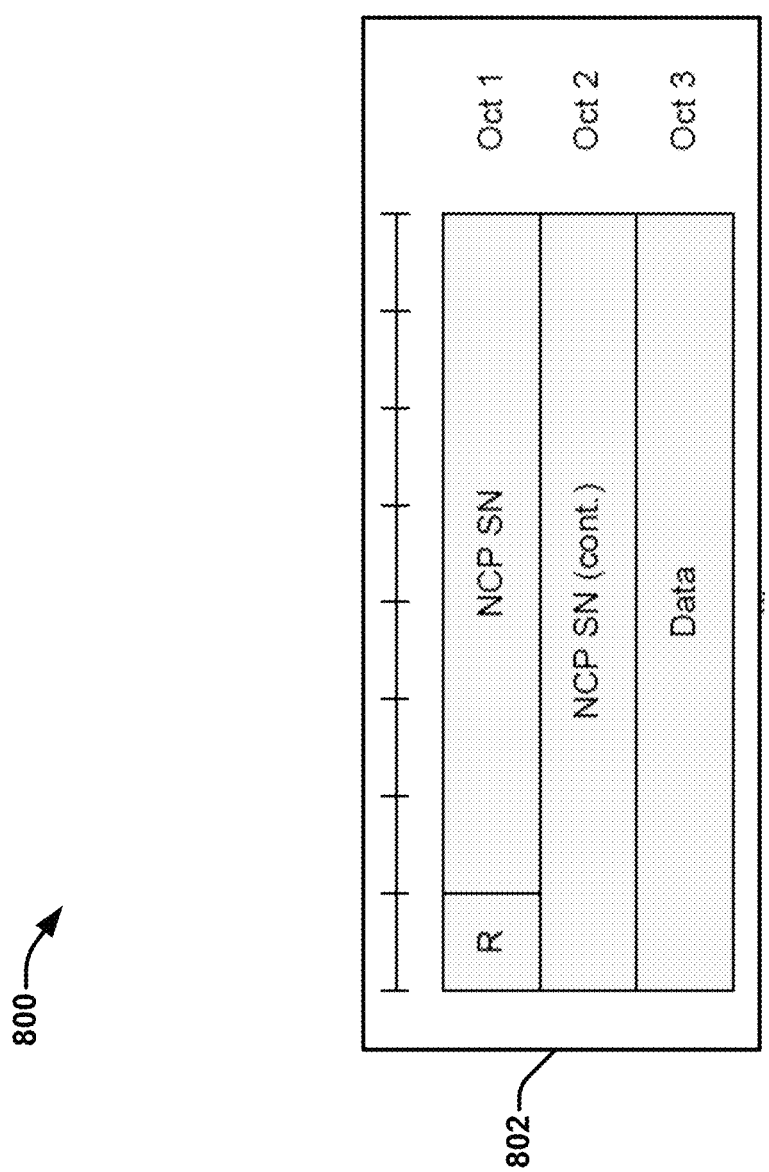
FIG. 8 illustrates another example packet data unit (PDU) format of a PDU according to various embodiments.

FIG. 8 illustrates a PDU 802 with another example PDU format 800 that can be implemented via the NCP layer 204. In this example format the SN can be explicitly included in the user plant NCP PDU format 800 of the PDU 802. However, the status report could be excluded and not explicitly transmitted in the NCP layer 204 in this example. In this case, the user plane "data" PDU can be transmitted with the SN. The PDU format 802, for example can be a 15 bit sequence number or some other bit length such as 12 bits, for example. The field "R" can be a reserved bit, in which there can be one or more reserve bits in the PDU 800.

Figure 9:
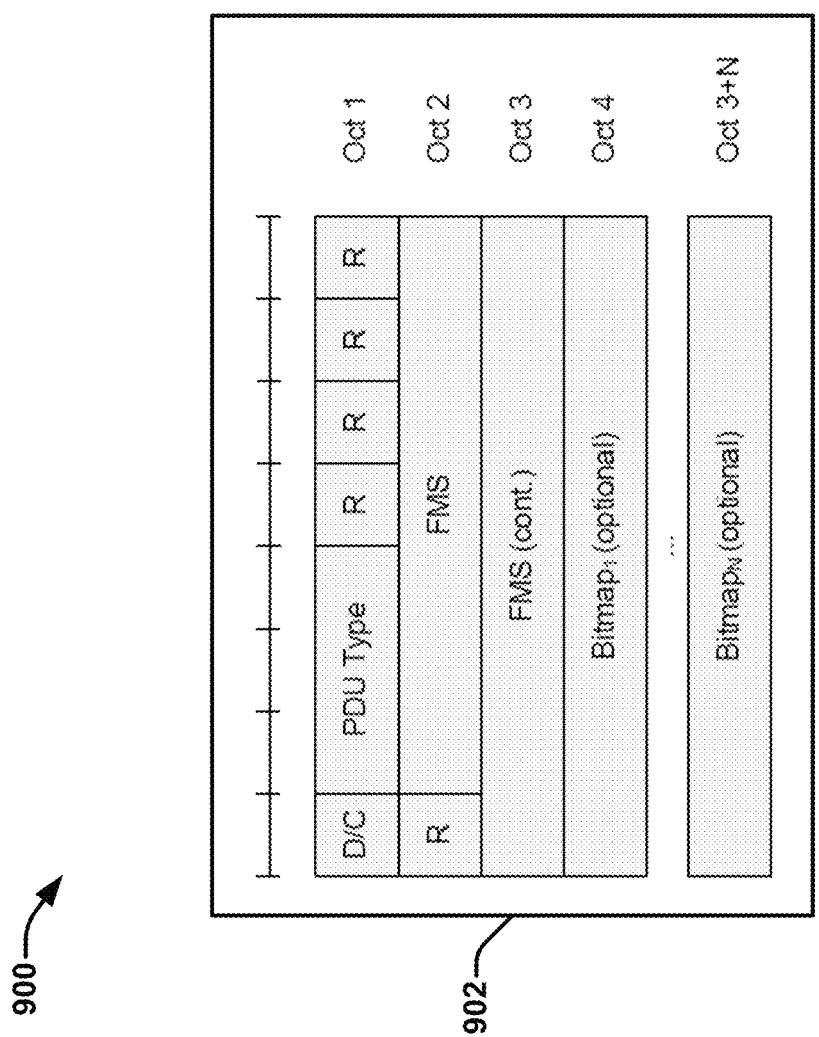
FIG. 9 illustrates another example packet data unit (PDU) format for a status report PDU according to various embodiments.

FIG. 9 illustrates a PDU 902 with another example PDU format 900 that can be implemented via the NCP layer 204. In this example format the status report can be explicitly transmitted in the NCP layer 204, and the SN could not be explicitly included in the user plane NCP layer PDU 902. The PDU 902 is also illustrated in FIG. 6 as status report 602 in a status report control PDU format, which can be with a bit sequence number (e.g., 15 bits or otherwise).

The format of PDU 902 can comprise a D/C indicator that indicates whether the PDU is a control PDU or a data PDU. For example, the control PDU could be indicated as zero, while the data PDU as one, or vice versa. The PDU type field can indicate the type of PDU, and can be defined for future extensibility. In this example it can be 000 as fixed. The "R" field can be the reserve bits. The first missing SN (FMS) can be the NCP layer SN of the first missing NCP SDU. The bitmaps can be designated as the most significant bit (MSB) of the first octet (Oct) of the type "Bitmap", which indicates whether or not the NCP SDU with the SN (FMS+1) modulo (Maximum_NCP_SN+1) has been received correctly. The least significant bit (LSB) of the first octet of the type "Bitmap" can indicate whether or not the NCP SDU with the SN (FMS+8) modulo (Maximum_NCP_SN+1) has been received. Maximum_NCP_SN=$2^N$−1, while N is the sequence number length. For example, a 15 bit sequence number, the Maximum_NCP_SN can be 32,767. Although only one example of a status report is provided, a status report can also be provided in other methods. For example, an explicit list of NCP SN(s) successfully received by the receiver side or logic component could also be provided.

Figure 10:
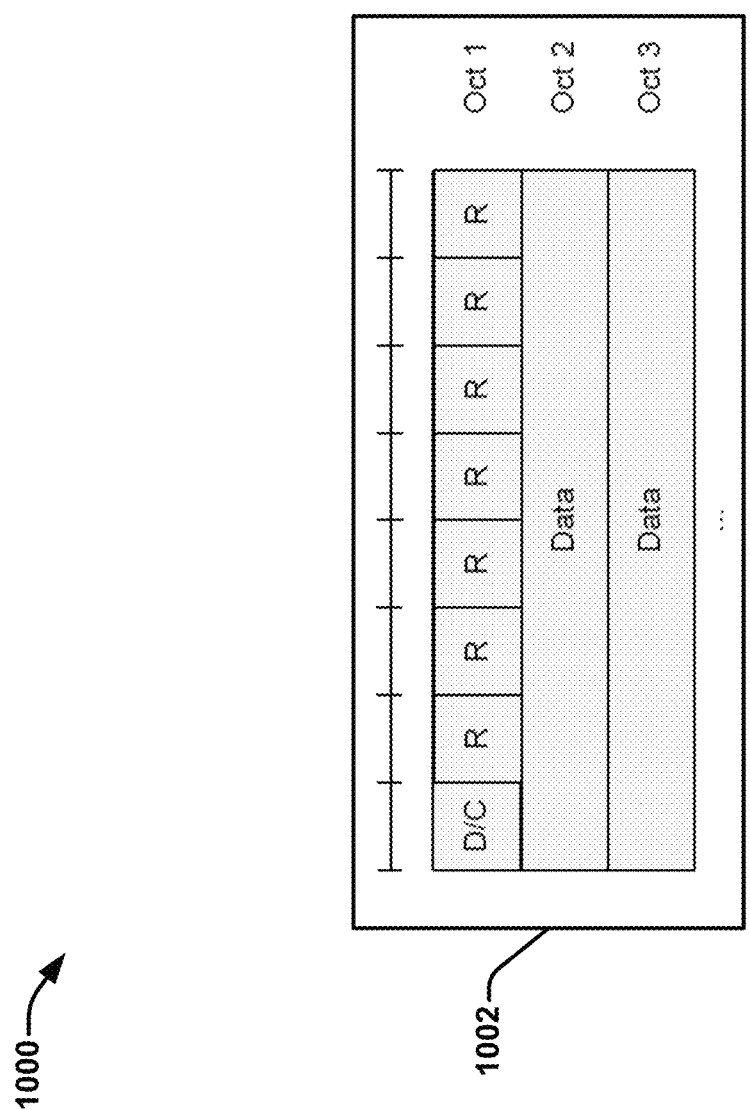
FIG. 10 illustrates another example packet data unit (PDU) format of a PDU according to various embodiments.

FIG. 10 illustrates a PDU 1002 with another example PDU format 1000 that can be implemented via the NCP layer 204. In this example format a user plane Data PDU can be transmitted without the SN. The PDU format is shown with 15 bit sequence number. Similarly, the D/C field indicates whether the PDU is control PDU or data PDU. For example, the control PDU can be indicated as 0, while data PDU as 1, or vice versa. Field "R" means the reserved bit.

It is also possible to define PDU formats with other lengths (e.g. 12 bits) for sequence number and another number of reserved bits.

Figure 11:
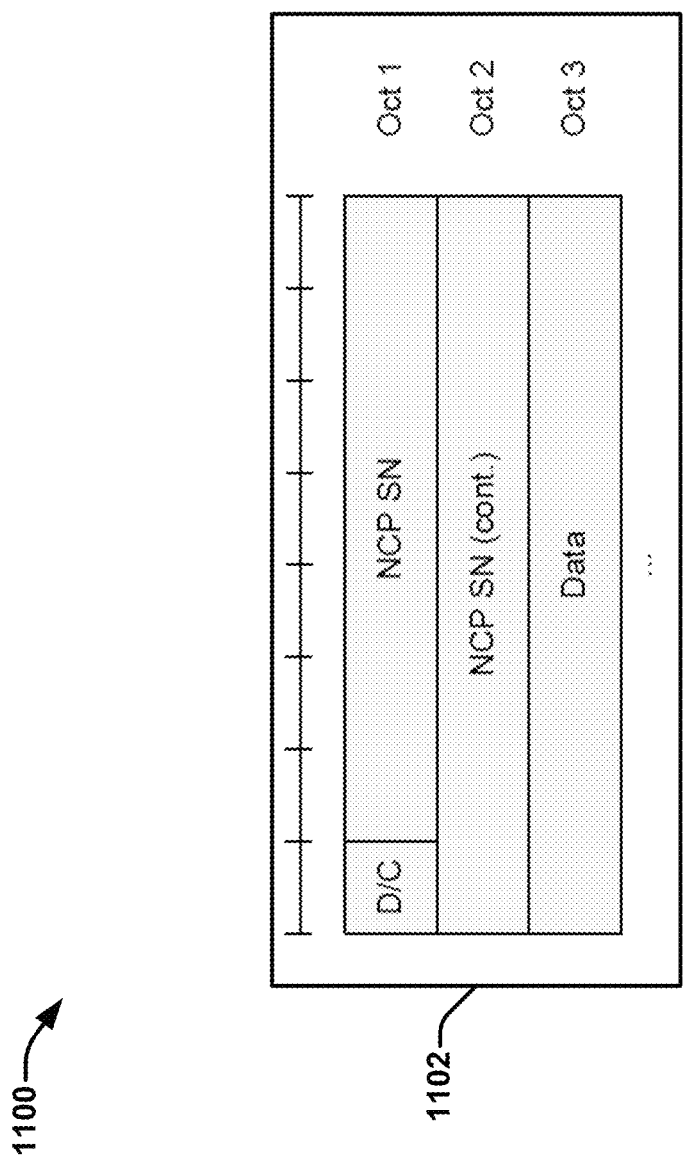
FIG. 11 illustrates another example packet data unit (PDU) format of a PDU according to various embodiments.

FIG. 11 illustrates a PDU 1102 with another example PDU format 1100 that can be implemented via the NCP layer 204. In this example format both sequence number and status report are explicitly transmitted in NCP layer 204. In this case, the status report control PDU format is same as that for the PDU 1000 of FIG. 10. In FIG. 11, the Data PDU format 1100 can also have a 15 bit sequence number, for example, (as field NCP SN), in which the format can also be similar as the PDU format 800 in FIG. 8 also, except for the field D/C which indicates whether the PDU is a control PDU or a data PDU. For example, control PDU can be indicated as 0, while data PDU as 1. It is also possible to define PDU formats with other lengths (e.g. 12 bits) for sequence number and/or other number of reserved bits.

While the methods described within this disclosure are illustrated in and described herein as a series of acts or events, it will be appreciated that the illustrated ordering of such acts or events are not to be interpreted in a limiting sense. For example, some acts may occur in different orders and/or concurrently with other acts or events apart from those illustrated and/or described herein. In addition, not all illustrated acts may be required to implement one or more aspects or embodiments of the description herein. Further, one or more of the acts depicted herein may be carried out in one or more separate acts and/or phases.

Figure 12:
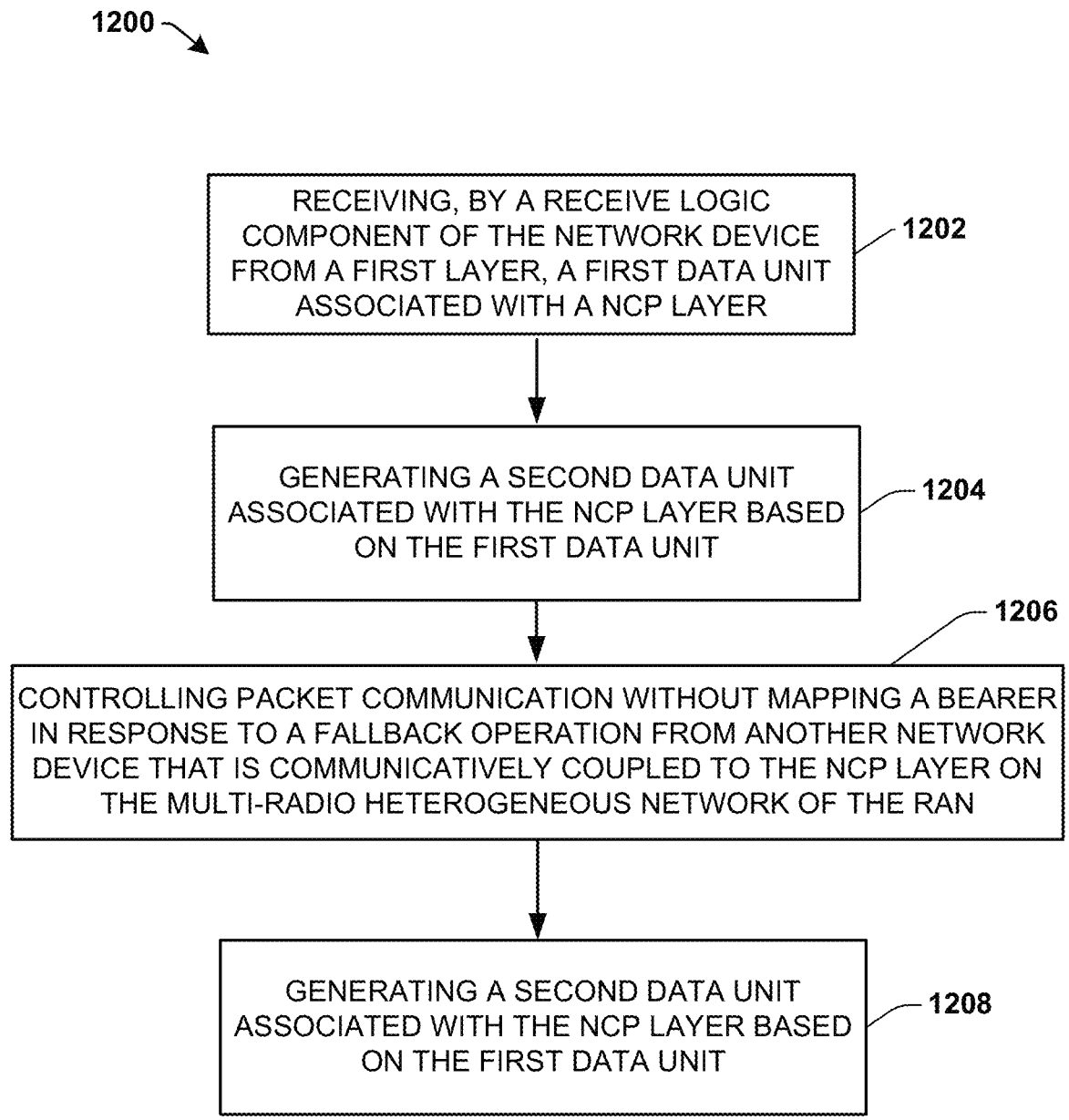
FIG. 12 illustrates an example process flow for an NCP layer according to various embodiments.

FIG. 12 illustrates a method 1200 for facilitating network operations in response to a fallback from a block in a heterogeneous network between LTE and 5G nodes. The method 1200, for example, and various aspects/embodiments discloses can be implemented on a computer-readable media or medium. The media or medium can comprise executable instructions that, in response to execution, cause a network device comprising one or more processors to perform operations in a multi-radio heterogeneous network of a radio access network (RAN), such as with an LTE node or 5G mmW node.

At 1202, the method initiates with receiving, by a receive logic component of the network device from a first layer, a first data unit associated with a network convergence protocol (NCP) layer.

At 1204, the method can include generating, by the one or more processors, a second data unit associated with the NCP layer based on the first data unit.

At 1206, the method can include controlling packet communication, via the NCP layer by the one or more processors, without mapping a bearer in response to a fallback operation from another network device that is communicatively coupled to the NCP layer on the multi-radio heterogeneous network of the RAN.

At 1208, the method can include transmitting, by the network device to a second layer, the second data unit associated with the NCP layer.

In one embodiment, the first layer can comprise an upper protocol layer, the first data unit can comprise a NCP service data unit (SDU), the second layer can comprise a lower protocol layer, and the second data unit can comprise a NCP protocol data unit (PDU). Alternatively or additionally, the first layer can comprise the lower protocol layer, the first data unit can comprise the NCP PDU, the second layer can comprise the upper protocol layer, and the second data unit can comprise the NCP SDU.

The upper protocol layer can be an internet protocol (IP) layer, while the lower protocol layer can be a packet data convergence protocol (PDCP) layer.

The generating, by the network device, the second data unit can be based on a reordering process, for example. In addition, the method can include performing a duplicate discard prior to a delivery of the NCP SDU to the upper protocol layer.

The method can further include transmitting, by the network device in the NCP layer, one or more of a sequence number or a status report, wherein the status report comprises a NCP sequence number of a first missing NCP SDU (FMS) and a bitmap indicating whether SDUs following the FMS have been successfully received.

Figure 13:
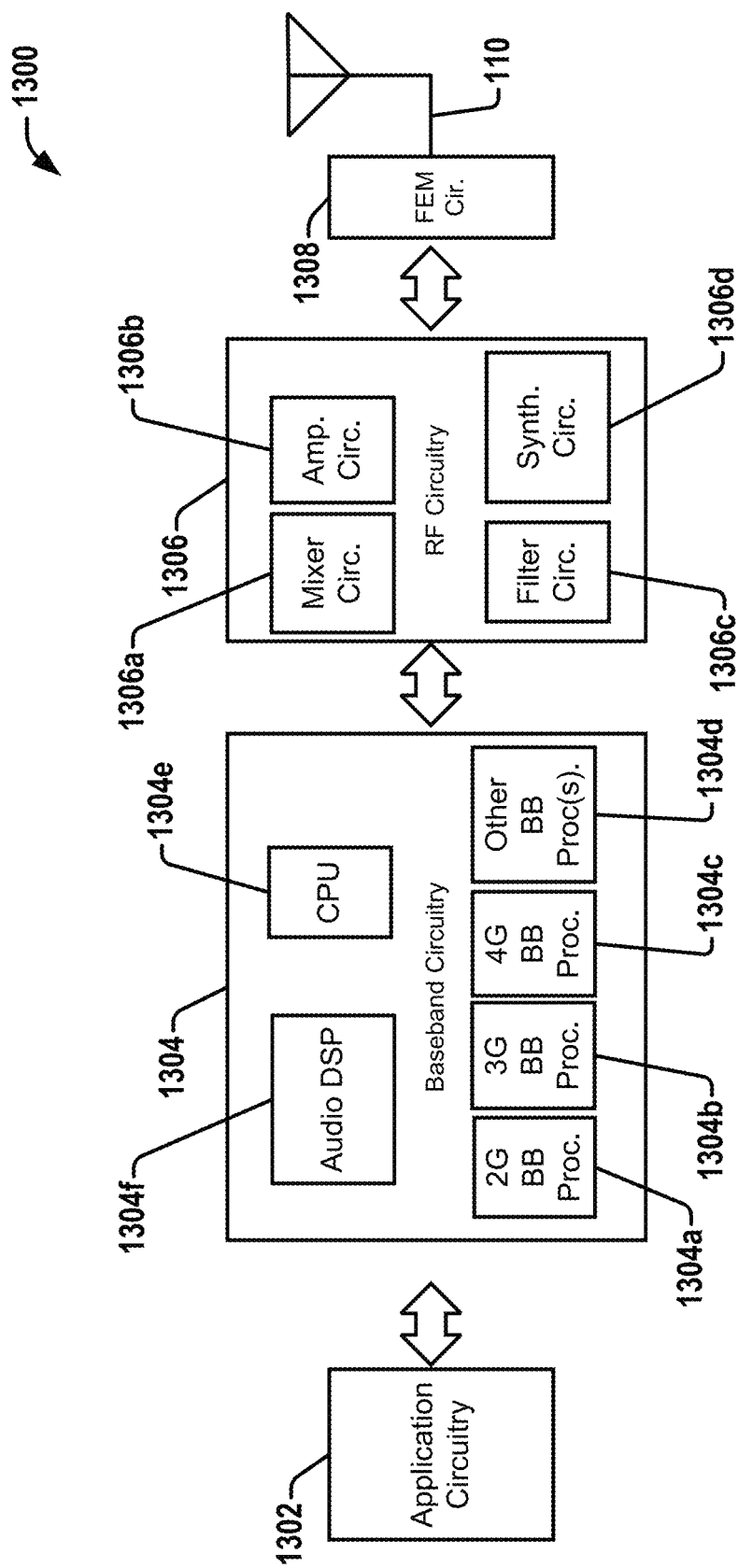
FIG. 13 is a block diagram illustrating an example user equipment (UE) useable in connection with various aspects described herein.

Embodiments described herein may be implemented into a system using any suitably configured hardware and/or software. FIG. 13 illustrates, for one embodiment, example components of a User Equipment (UE) device 1300. In some embodiments, the UE device 1300 may include application circuitry 1302, baseband circuitry 1304, Radio Frequency (RF) circuitry 1306, front-end module (FEM) circuitry 1308 and one or more antennas 1310, coupled together at least as shown.

The application circuitry 1302 may include one or more application processors. For example, the application circuitry 1302 may include circuitry such as, but not limited to, one or more single-core or multi-core processors. The processor(s) may include any combination of general-purpose processors and dedicated processors (e.g., graphics processors, application processors, etc.). The processors may be coupled with and/or may include memory/storage and may be configured to execute instructions stored in the memory/storage to enable various applications and/or operating systems to run on the system.

The baseband circuitry 1304 may include circuitry such as, but not limited to, one or more single-core or multi-core processors. The baseband circuitry 1304 may include one or more baseband processors and/or control logic to process baseband signals received from a receive signal path of the RF circuitry 1306 and to generate baseband signals for a transmit signal path of the RF circuitry 1306. Baseband processing circuity 1304 may interface with the application circuitry 1302 for generation and processing of the baseband signals and for controlling operations of the RF circuitry 1306. For example, in some embodiments, the baseband circuitry 1304 may include a second generation (2G) baseband processor 1304a, third generation (3G) baseband processor 1304b, fourth generation (4G) baseband processor 1304c, and/or other baseband processor(s) 1304d for other existing generations, generations in development or to be developed in the future (e.g., fifth generation (5G), 6G, etc.). The baseband circuitry 1304 (e.g., one or more of baseband processors 1304a-d) may handle various radio control functions that enable communication with one or more radio networks via the RF circuitry 1306. The radio control functions may include, but are not limited to, signal modulation/demodulation, encoding/decoding, radio frequency shifting, etc. In some embodiments, modulation/demodulation circuitry of the baseband circuitry 1304 may include Fast-Fourier Transform (FFT), precoding, and/or constellation mapping/demapping functionality. In some embodiments, encoding/decoding circuitry of the baseband circuitry 1304 may include convolution, tail-biting convolution, turbo, Viterbi, and/or Low Density Parity Check (LDPC) encoder/decoder functionality. Embodiments of modulation/demodulation and encoder/decoder functionality are not limited to these examples and may include other suitable functionality in other embodiments.

In some embodiments, the baseband circuitry 1304 may include elements of a protocol stack such as, for example, elements of an evolved universal terrestrial radio access network (EUTRAN) protocol including, for example, physical (PHY), media access control (MAC), radio link control (RLC), packet data convergence protocol (PDCP), and/or radio resource control (RRC) elements. A central processing unit (CPU) 1304e of the baseband circuitry 1304 may be configured to run elements of the protocol stack for signaling of the PHY, MAC, RLC, PDCP and/or RRC layers. In some embodiments, the baseband circuitry may include one or more audio digital signal processor(s) (DSP) 1304f. The audio DSP(s) 1304f may be include elements for compression/decompression and echo cancellation and may include other suitable processing elements in other embodiments. Components of the baseband circuitry may be suitably combined in a single chip, a single chipset, or disposed on a same circuit board in some embodiments. In some embodiments, some or all of the constituent components of the baseband circuitry 1304 and the application circuitry 1302 may be implemented together such as, for example, on a system on a chip (SOC).

In some embodiments, the baseband circuitry 1304 may provide for communication compatible with one or more radio technologies. For example, in some embodiments, the baseband circuitry 1304 may support communication with an evolved universal terrestrial radio access network (EUTRAN) and/or other wireless metropolitan area networks (WMAN), a wireless local area network (WLAN), a wireless personal area network (WPAN). Embodiments in which the baseband circuitry 1304 is configured to support radio communications of more than one wireless protocol may be referred to as multi-mode baseband circuitry.

RF circuitry 1306 may enable communication with wireless networks using modulated electromagnetic radiation through a non-solid medium. In various embodiments, the RF circuitry 1306 may include switches, filters, amplifiers, etc. to facilitate the communication with the wireless network. RF circuitry 1306 may include a receive signal path which may include circuitry to down-convert RF signals received from the FEM circuitry 1308 and provide baseband signals to the baseband circuitry 1304. RF circuitry 1306 may also include a transmit signal path which may include circuitry to up-convert baseband signals provided by the baseband circuitry 1304 and provide RF output signals to the FEM circuitry 1308 for transmission.

In some embodiments, the RF circuitry 1306 may include a receive signal path and a transmit signal path. The receive signal path of the RF circuitry 1306 may include mixer circuitry 1306a, amplifier circuitry 1306b and filter circuitry 1306c. The transmit signal path of the RF circuitry 1306 may include filter circuitry 1306c and mixer circuitry 1306a. RF circuitry 1306 may also include synthesizer circuitry 1306d for synthesizing a frequency for use by the mixer circuitry 1306a of the receive signal path and the transmit signal path. In some embodiments, the mixer circuitry 1306a of the receive signal path may be configured to down-convert RF signals received from the FEM circuitry 1308 based on the synthesized frequency provided by synthesizer circuitry 1306d. The amplifier circuitry 1306b may be configured to amplify the down-converted signals and the filter circuitry 1306c may be a low-pass filter (LPF) or band-pass filter (BPF) configured to remove unwanted signals from the down-converted signals to generate output baseband signals. Output baseband signals may be provided to the baseband circuitry 1304 for further processing. In some embodiments, the output baseband signals may be zero-frequency baseband signals, although this is not a requirement. In some embodiments, mixer circuitry 1306a of the receive signal path may comprise passive mixers, although the scope of the embodiments is not limited in this respect.

In some embodiments, the mixer circuitry 1306a of the transmit signal path may be configured to up-convert input baseband signals based on the synthesized frequency provided by the synthesizer circuitry 1306d to generate RF output signals for the FEM circuitry 1308. The baseband signals may be provided by the baseband circuitry 1304 and may be filtered by filter circuitry 1306c. The filter circuitry 1306c may include a low-pass filter (LPF), although the scope of the embodiments is not limited in this respect.

In some embodiments, the mixer circuitry 1306a of the receive signal path and the mixer circuitry 1306a of the transmit signal path may include two or more mixers and may be arranged for quadrature downconversion and/or upconversion respectively. In some embodiments, the mixer circuitry 1306a of the receive signal path and the mixer circuitry 1306a of the transmit signal path may include two or more mixers and may be arranged for image rejection (e.g., Hartley image rejection). In some embodiments, the mixer circuitry 1306a of the receive signal path and the mixer circuitry 1306a may be arranged for direct downconversion and/or direct upconversion, respectively. In some embodiments, the mixer circuitry 1306a of the receive signal path and the mixer circuitry 1306a of the transmit signal path may be configured for super-heterodyne operation.

In some embodiments, the output baseband signals and the input baseband signals may be analog baseband signals, although the scope of the embodiments is not limited in this respect. In some alternate embodiments, the output baseband signals and the input baseband signals may be digital baseband signals. In these alternate embodiments, the RF circuitry 1306 may include analog-to-digital converter (ADC) and digital-to-analog converter (DAC) circuitry and the baseband circuitry 1304 may include a digital baseband interface to communicate with the RF circuitry 1306.

In some dual-mode embodiments, a separate radio IC circuitry may be provided for processing signals for each spectrum, although the scope of the embodiments is not limited in this respect.

In some embodiments, the synthesizer circuitry 1306d may be a fractional-N synthesizer or a fractional N/N+1 synthesizer, although the scope of the embodiments is not limited in this respect as other types of frequency synthesizers may be suitable. For example, synthesizer circuitry 1306d may be a delta-sigma synthesizer, a frequency multiplier, or a synthesizer comprising a phase-locked loop with a frequency divider.

The synthesizer circuitry 1306d may be configured to synthesize an output frequency for use by the mixer circuitry 1306a of the RF circuitry 1306 based on a frequency input and a divider control input. In some embodiments, the synthesizer circuitry 1306d may be a fractional N/N+1 synthesizer.

In some embodiments, frequency input may be provided by a voltage controlled oscillator (VCO), although that is not a requirement. Divider control input may be provided by either the baseband circuitry 1304 or the applications processor 1302 depending on the desired output frequency. In some embodiments, a divider control input (e.g., N) may be determined from a look-up table based on a channel indicated by the applications processor 1302.

Synthesizer circuitry 1306d of the RF circuitry 1306 may include a divider, a delay-locked loop (DLL), a multiplexer and a phase accumulator. In some embodiments, the divider may be a dual modulus divider (DMD) and the phase accumulator may be a digital phase accumulator (DPA). In some embodiments, the DMD may be configured to divide the input signal by either N or N+1 (e.g., based on a carry out) to provide a fractional division ratio. In some example embodiments, the DLL may include a set of cascaded, tunable, delay elements, a phase detector, a charge pump and a D-type flip-flop. In these embodiments, the delay elements may be configured to break a VCO period up into Nd equal packets of phase, where Nd is the number of delay elements in the delay line. In this way, the DLL provides negative feedback to help ensure that the total delay through the delay line is one VCO cycle.

In some embodiments, synthesizer circuitry 1306d may be configured to generate a carrier frequency as the output frequency, while in other embodiments, the output frequency may be a multiple of the carrier frequency (e.g., twice the carrier frequency, four times the carrier frequency) and used in conjunction with quadrature generator and divider circuitry to generate multiple signals at the carrier frequency with multiple different phases with respect to each other. In some embodiments, the output frequency may be a LO frequency ($f_{LO}$). In some embodiments, the RF circuitry 1306 may include an IQ/polar converter.

FEM circuitry 1308 may include a receive signal path which may include circuitry configured to operate on RF signals received from one or more antennas 1310, amplify the received signals and provide the amplified versions of the received signals to the RF circuitry 1306 for further processing. FEM circuitry 1308 may also include a transmit signal path which may include circuitry configured to amplify signals for transmission provided by the RF circuitry 1306 for transmission by one or more of the one or more antennas 1310.

In some embodiments, the FEM circuitry 1308 may include a TX/RX switch to switch between transmit mode and receive mode operation. The FEM circuitry may include a receive signal path and a transmit signal path. The receive signal path of the FEM circuitry may include a low-noise amplifier (LNA) to amplify received RF signals and provide the amplified received RF signals as an output (e.g., to the RF circuitry 1306). The transmit signal path of the FEM circuitry 1308 may include a power amplifier (PA) to amplify input RF signals (e.g., provided by RF circuitry 1306), and one or more filters to generate RF signals for subsequent transmission (e.g., by one or more of the one or more antennas 1310.

In some embodiments, the UE device 1300 may include additional elements such as, for example, memory/storage, display, camera, sensor, and/or input/output (I/O) interface.

Figure 14:
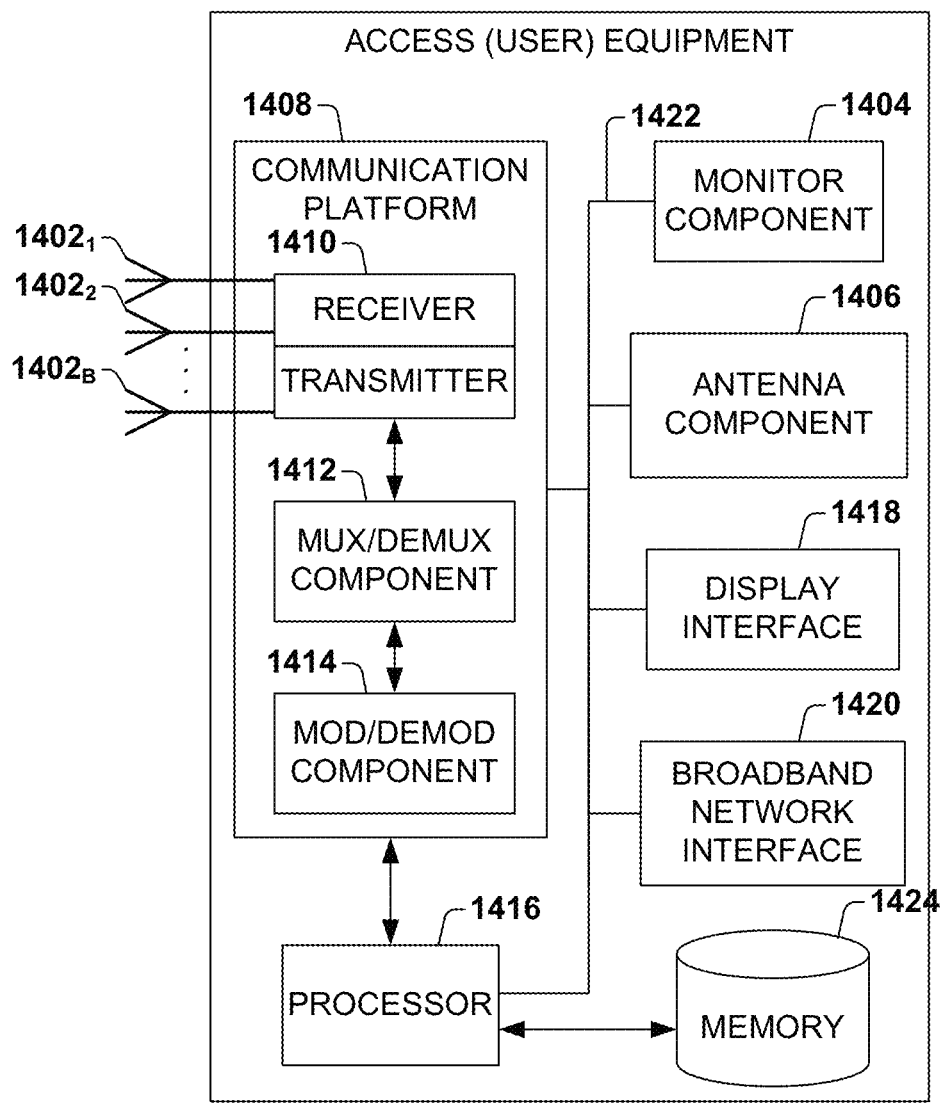
FIG. 14 is a block diagram of an enhanced node B (eNB) or other network device that facilitates bearer splitting according to various aspects described herein.

To provide further context for various aspects of the disclosed subject matter, FIG. 14 illustrates a block diagram of an embodiment of access (or user) equipment related to access of a network (e.g., network device, base station, wireless access point, femtocell access point, and so forth) that can enable and/or exploit features or aspects disclosed herein.

Access equipment (e.g., eNB, network entity, or the like), UE or software related to access of a network can receive and transmit signal(s) from and to wireless devices, wireless ports, wireless routers, etc. through segments 1402$_1$-1402$_B$ (B is a positive integer). Segments 1402$_1$-1402$_B$ can be internal and/or external to access equipment and/or software related to access of a network, and can be controlled by a monitor component 1404 and an antenna component 1406. Monitor component 1404 and antenna component 1406 can couple to communication platform 1408, which can include electronic components and associated circuitry that provide for processing and manipulation of received signal(s) and other signal(s) to be transmitted.

In an aspect, communication platform 1408 includes a receiver/transmitter 1410 that can convert analog signals to digital signals upon reception of the analog signals, and can convert digital signals to analog signals upon transmission. In addition, receiver/transmitter 1410 can divide a single data stream into multiple, parallel data streams, or perform the reciprocal operation. Coupled to receiver/transmitter 1410 can be a multiplexer/demultiplexer 1412 that can facilitate manipulation of signals in time and frequency space. Multiplexer/demultiplexer 1412 can multiplex information (data/traffic and control/signaling) according to various multiplexing schemes such as time division multiplexing, frequency division multiplexing, orthogonal frequency division multiplexing, code division multiplexing, space division multiplexing. In addition, multiplexer/demultiplexer component 1412 can scramble and spread information (e.g., codes, according to substantially any code known in the art, such as Hadamard-Walsh codes, Baker codes, Kasami codes, polyphase codes, and so forth).

A modulator/demodulator 1414 is also a part of communication platform 1408, and can modulate information according to multiple modulation techniques, such as frequency modulation, amplitude modulation (e.g., M-ary quadrature amplitude modulation, with M a positive integer); phase-shift keying; and so forth).

Access equipment and/or software related to access of a network also includes a processor 1416 configured to confer, at least in part, functionality to substantially any electronic component in access equipment and/or software. In particular, processor 1416 can facilitate configuration of access equipment and/or software through, for example, monitor component 1404, antenna component 1406, and one or more components therein. Additionally, access equipment and/or software can include display interface 1418, which can display functions that control functionality of access equipment and/or software or reveal operation conditions thereof. In addition, display interface 1418 can include a screen to convey information to an end user. In an aspect, display interface 1418 can be a liquid crystal display, a plasma panel, a monolithic thin-film based electrochromic display, and so on. Moreover, display interface 1418 can include a component (e.g., speaker) that facilitates communication of aural indicia, which can also be employed in connection with messages that convey operational instructions to an end user. Display interface 1418 can also facilitate data entry (e.g., through a linked keypad or through touch gestures), which can cause access equipment and/or software to receive external commands (e.g., restart operation).

Broadband network interface 1420 facilitates connection of access equipment and/or software to a service provider network (not shown) that can include one or more cellular technologies (e.g., third generation partnership project universal mobile telecommunication system, global system for mobile communication, and so on) through backhaul link(s) (not shown), which enable incoming and outgoing data flow. Broadband network interface 1420 can be internal or external to access equipment and/or software and can utilize display interface 1418 for end-user interaction and status information delivery.

Processor 1416 can be functionally connected to communication platform 1408 and can facilitate operations on data (e.g., symbols, bits, or chips) for multiplexing/demultiplexing, such as effecting direct and inverse fast Fourier transforms, selection of modulation rates, selection of data packet formats, inter-packet times, and so on. Moreover, processor 1416 can be functionally connected, through data, system, or an address bus 1422, to display interface 1418 and broadband network interface 1420, to confer, at least in part, functionality to each of such components.

In access (user) equipment and/or software memory 1424 can retain location and/or coverage area (e.g., macro sector, identifier(s)) access list(s) that authorize access to wireless coverage through access equipment and/or software sector intelligence that can include ranking of coverage areas in the wireless environment of access equipment and/or software, radio link quality and strength associated therewith, or the like. Memory 1424 also can store data structures, code instructions and program modules, system or device information, code sequences for scrambling, spreading and pilot transmission, access point configuration, and so on. Processor 1416 can be coupled (e.g., through a memory bus), to memory 1424 in order to store and retrieve information used to operate and/or confer functionality to the components, platform, and interface that reside within access equipment and/or software.

FIG. 14 illustrates an electronic device (e.g., access equipment or UE) that can be, or can be incorporated into or otherwise part of, an eNB, a UE, or some other type of electronic device in accordance with various embodiments. Specifically, the electronic device can be logic and/or circuitry that can be at least partially implemented in one or more of hardware, software, and/or firmware. In embodiments, the electronic device logic can include radio transmit logic and receive logic (e.g., 1410) coupled to control logic (e.g., 1416). In embodiments, the transmit and/or receive logic can be elements or modules of transceiver logic, as shown. The electronic device and/or the components of the electronic device can be configured to perform operations similar to those described elsewhere in this disclosure.

In embodiments, the receive logic can be to receive, from a first layer, a first data unit associated with a Network Convergence Protocol (NCP) layer. The control logic can be to process the first data unit to generate a second data unit associated with the NCP layer. The transmit logic can be to transmit the second data unit to a second layer.

In some embodiments, the electronic device can be configured to perform one or more processes or methods as described herein. In embodiments, the process can include receiving, by an electronic device from a first layer, a first data unit associated with a Network Convergence Protocol (NCP) layer. The process can further include transmitting, by the electronic device to a second layer, a second data unit associated with the NCP layer, wherein the second data unit is based on the first data unit As it employed in the subject specification, the term "processor" can refer to substantially any computing processing unit or device including, but not limited to including, single-core processors; single-processors with software multithread execution capability; multi-core processors; multi-core processors with software multithread execution capability; multi-core processors with hardware multithread technology; parallel platforms; and parallel platforms with distributed shared memory. Additionally, a processor can refer to an integrated circuit, an application specific integrated circuit, a digital signal processor, a field programmable gate array, a programmable logic controller, a complex programmable logic device, a discrete gate or transistor logic, discrete hardware components, or any combination thereof designed to perform the functions and/or processes described herein. Processors can exploit nano-scale architectures such as, but not limited to, molecular and quantum-dot based transistors, switches and gates, in order to optimize space usage or enhance performance of mobile devices. A processor may also be implemented as a combination of computing processing units.

In the subject specification, terms such as "store," "data store," data storage," "database," and substantially any other information storage component relevant to operation and functionality of a component and/or process, refer to "memory components," or entities embodied in a "memory," or components including the memory. It is noted that the memory components described herein can be either volatile memory or nonvolatile memory, or can include both volatile and nonvolatile memory.

By way of illustration, and not limitation, nonvolatile memory, for example, can be included in a memory, nonvolatile memory (see below), disk storage (see below), and memory storage (see below). Further, nonvolatile memory can be included in read only memory, programmable read only memory, electrically programmable read only memory, electrically erasable programmable read only memory, or flash memory. Volatile memory can include random access memory, which acts as external cache memory. By way of illustration and not limitation, random access memory is available in many forms such as synchronous random access memory, dynamic random access memory, synchronous dynamic random access memory, double data rate synchronous dynamic random access memory, enhanced synchronous dynamic random access memory, Synchlink dynamic random access memory, and direct Rambus random access memory. Additionally, the disclosed memory components of systems or methods herein are intended to include, without being limited to including, these and any other suitable types of memory.

Examples can include subject matter such as a method, means for performing acts or blocks of the method, at least one machine-readable medium including instructions that, when performed by a machine cause the machine to perform acts of the method or of an apparatus or system for concurrent communication using multiple communication technologies according to embodiments and examples described herein.

Example 1 is an apparatus for a user equipment (UE) device communicatively coupled to a multi-radio heterogeneous network of a radio access network (RAN) comprising a memory that stores computer-executable components; and a processing circuitry, communicatively coupled to the memory, that facilitates execution of the computer-executable components, the computer-executable components. A control logic component comprises a network convergence protocol (NCP) layer component configured to generate packet data based on different radio access technologies, including a 5G millimeter wave RAT, generate a NCP layer protocol data unit (PDU) in response to receiving a NCP layer service data unit (SDU), and in response to receiving the NCP layer PDU generate the NCP layer SDU. A transmit side logic component configured to provide the NCP layer PDU to a lower protocol layer in response to obtaining the NCP layer SDU from an upper protocol layer. A receive side logic component configured to provide the NCP layer SDU to the upper protocol layer in response to obtaining the NCP layer PDU from the lower protocol layer.

Example 2 includes the subject matter of Example 1, wherein the upper protocol layer comprises an Internet Protocol (IP) layer, and the lower protocol layer comprises a Packet Data Convergence Protocol (PDCP) layer.

Example 3 includes the subject matter of any one of Examples 1-2, including or omitting optional elements, wherein the NCP layer component is further configured to enable a fallback operation to a first network device comprising a 5G access node, or to a second network device comprising a long term evolution (LTE) access node.

Example 4 includes the subject matter of any one of Examples 1-3, including or omitting optional elements, 1, wherein the NCP layer component is further configured to reduce an interruption time during a fallback operation without a bearer switching process from a first network device to a second network device, and communicate with the first network device and the second network device via different radio access technologies (RAT) in the multi-radio heterogeneous network of the RAN.

Example 5 includes the subject matter of any one of Examples 1-4, including or omitting optional elements, further comprising an interface component configured to infer a sequence number from the lower protocol layer, or wherein the NCP layer component is further configured to transmit the sequence number in a NCP layer with at least one of the NCP layer SDU or the NCP layer PDU.

Example 6 includes the subject matter of any one of Examples 1-5, including or omitting optional elements, a reordering component configured to generate a reordering process with NCP packets at a NCP layer in response to one or more of the NCP packets being out-of-sequence or missing before a delivery of the NCP layer SDU to the upper protocol layer; and a duplication component configured to discard a duplicate NCP packet at the NCP layer before the delivery of the NCP layer SDU to the upper protocol layer.

Example 7 includes the subject matter of any one of Examples 1-6, including or omitting optional elements, further comprising: a status report component configured to generate a status report via a NCP layer as a NCP packet, wherein the status report comprises at least one of a NCP sequence number of a first missing NCP layer SDU (FMS) of a plurality of NCP layer SDUs, a bitmap indicating whether SDUs following the FMS of the plurality of NCP layer SDUs are successfully received, or a field of a NCP layer header indicating whether the NCP packet is a control NCP layer PDU or a data NCP layer PDU.

Example 8 includes the subject matter of any one of Examples 1-3, including or omitting optional elements, further comprising: one or more antenna ports; one or more receivers, coupled to the one or more antenna ports and the receive side logic component, configured to receive the NCP layer PDU from the lower protocol layer or the NCP layer SDU from the upper protocol layer; and one or more transmitters, coupled to the one or more antenna ports and the transmit side logic component, configured to provide the NCP layer SDU to the upper protocol layer or the NCP layer PDU from the lower protocol layer.

Example 9 is an apparatus for an evolved NodeB (eNB) communicatively coupled to a multi-radio heterogeneous network of a radio access network (RAN). The apparatus comprises a memory that stores computer-executable components; and a processing circuitry, communicatively coupled to the memory, that facilitates execution of the computer-executable components. The computer-executable components include a receive logic component configured to receive, from a first layer, a first data unit associated with a network convergence protocol (NCP) layer; a control logic component, communicatively coupled to the receive logic component, configured to generate a second data unit associated with the NCP layer based on the first data unit; and a transmit logic component, communicatively coupled to the control logic component, configured to transmit the second data unit to a second layer.

Example 10 includes the subject matter of Example 9, including or omitting optional elements, wherein the first layer comprises an upper protocol layer comprising an internet protocol (IP) layer, the first data unit comprises a NCP service data unit (SDU), the second layer comprises a lower protocol layer comprises a packet data convergence protocol (PDCP) layer, and the second data unit comprises a NCP protocol data unit (PDU), or wherein the first layer comprises the lower protocol layer comprising the PDCP layer, the first data unit comprises the NCP PDU, the second layer comprises the upper protocol layer comprising the IP layer, and the second data unit comprises the NCP SDU.

Example 11 includes the subject matter of any one of Examples 9-10, including or omitting optional elements, wherein the control logic component is further configured to generate the second data unit based on a reordering process in response to an indication of a missing NCP packet or an out-of-order packet sequence.

Example 12 includes the subject matter of any one of Examples 9-11, including or omitting optional elements, wherein the control logic component is further configured to provide a field in a header of the NCP layer that indicates whether an NCP PDU is a control NCP PDU or a data NCP PDU.

Example 13 includes the subject matter of any one of Examples 9-12, including or omitting optional elements, wherein the transmit logic is further configured to transmit, in the NCP layer, a sequence number and a status report configured to indicated one or more NCP packets that have been successfully received among a plurality of NCP packets.

Example 14 includes the subject matter of any one of Examples 9-13, including or omitting optional elements, wherein the status report comprises a NCP sequence number of a first missing NCP SDU (FMS), and a bitmap indicating whether SDUs following the FMS are successfully received or not.

Example 15 includes the subject matter of any one of Examples 9-14, including or omitting optional elements, wherein the control logic component is further configured to perform a duplicate discard prior to delivery of the NCP SDU to an upper protocol layer.

Example 16 includes the subject matter of any one of Examples 9-15, including or omitting optional elements, wherein the control logic component is configured to generate a status report based on NCP packets that have been successively received in a sequence of NCP packets in response to a trigger event that comprises at least one of satisfying a predetermined number of the sequence of NCP packets being received, a period of time elapsing, an amount of packet data being received, or a radio resource control (RRC) signal from an upper protocol layer.

Example 17 includes the subject matter of any one of Examples 9-16, including or omitting optional elements, wherein the control logic component is configured to generate a status report based on NCP packets that have been successively received in a sequence of NCP packets in response to a trigger event related to the fallback operation, wherein the trigger event comprises a disruption or blockage of a communication link, a receipt of a PDU via a different radio link of the network device.

Example 18 includes the subject matter of any one of Examples 9-17, including or omitting optional elements, wherein the NCP layer is configured to control packet flow without a bearer switching process by enabling one or more retransmissions based on a fallback operation resulting from a blockage condition of a 5G mmW RAT communication.

Example 19 is a computer-readable media comprising executable instructions that, in response to execution, cause a network device comprising one or more processors to perform operations in a multi-radio heterogeneous network of a radio access network (RAN). The operations comprise: receiving, by a receive logic component of the network device from a first layer, a first data unit associated with a network convergence protocol (NCP) layer; generating, by the one or more processors, a second data unit associated with the NCP layer based on the first data unit; controlling packet communication, via the NCP layer by the one or more processors, without mapping a bearer in response to a fallback operation from another network device that is communicatively coupled to the NCP layer on the multi-radio heterogeneous network of the RAN; and transmitting, by the network device to a second layer, the second data unit associated with the NCP layer.

Example 20 includes the subject matter of Example 19, including or omitting optional elements, wherein the first layer comprises an upper protocol layer, the first data unit comprises a NCP service data unit (SDU), the second layer comprises a lower protocol layer, and the second data unit comprises a NCP protocol data unit (PDU), or wherein the first layer comprises the lower protocol layer, the first data unit comprises the NCP PDU, the second layer comprises the upper protocol layer, and the second data unit comprises the NCP SDU.

Example 21 includes the subject matter of Examples 19-20, including or omitting optional elements, wherein the upper protocol layer is an internet protocol (IP) layer, and the lower protocol layer is a packet data convergence protocol (PDCP) layer.

Example 22 includes the subject matter of any one of Examples 19-21, including or omitting optional elements, wherein the operations further comprising: generating, by the network device, the second data unit based on a reordering process.

Example 23 includes the subject matter of any one of Examples 19-22, including or omitting optional elements, wherein the operations further comprise: transmitting, by the network device in the NCP layer, one or more of a sequence number or a status report, wherein the status report comprises a NCP sequence number of a first missing NCP SDU (FMS) and a bitmap indicating whether SDUs following the FMS have been successfully received.

Example 24 includes the subject matter of any one of Examples 19-23, including or omitting optional elements, wherein the operations further comprise: performing a duplicate discard prior to a delivery of the NCP SDU to the upper protocol layer.

Example 25 includes the subject matter of any one of Examples 19-24, including or omitting optional elements, wherein the operations further comprise: generating a status report based on NCP packets that have been successively received in a sequence of NCP packets in response to a trigger event related to the fallback operation.

Example 26 is a system comprising: a means for receiving, by from a first layer, a first data unit associated with a network convergence protocol (NCP) layer; a means for generating a second data unit associated with the NCP layer based on the first data unit; a means for controlling packet communication, via the NCP layer, without mapping a bearer in response to a fallback operation from another network device that is communicatively coupled to the NCP layer on the multi-radio heterogeneous network of the RAN; and a means for transmitting, to a second layer, the second data unit associated with the NCP layer.

Example 27 includes the subject matter of Example 26, wherein the first layer comprises an upper protocol layer, the first data unit comprises a NCP service data unit (SDU), the second layer comprises a lower protocol layer, and the second data unit comprises a NCP protocol data unit (PDU), or wherein the first layer comprises the lower protocol layer, the first data unit comprises the NCP PDU, the second layer comprises the upper protocol layer, and the second data unit comprises the NCP SDU.

It is to be understood that aspects described herein can be implemented by hardware, software, firmware, or any combination thereof. When implemented in software, functions can be stored on or transmitted over as one or more instructions or code on a computer-readable medium. Computer-readable media includes both computer storage media and communication media including any medium that facilitates transfer of a computer program from one place to another. A storage media or a computer readable storage device can be any available media that can be accessed by a general purpose or special purpose computer. By way of example, and not limitation, such computer-readable media can comprise RAM, ROM, EEPROM, CD-ROM or other optical disk storage, magnetic disk storage or other magnetic storage devices, or other tangible and/or non-transitory medium, that can be used to carry or store desired information or executable instructions. Also, any connection is properly termed a computer-readable medium. For example, if software is transmitted from a website, server, or other remote source using a coaxial cable, fiber optic cable, twisted pair, digital subscriber line (DSL), or wireless technologies such as infrared, radio, and microwave, then coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and blu-ray disc where disks usually reproduce data magnetically, while discs reproduce data optically with lasers. Combinations of the above should also be included within the scope of computer-readable media.

Various illustrative logics, logical blocks, modules, and circuits described in connection with aspects disclosed herein can be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform functions described herein. A general-purpose processor can be a microprocessor, but, in the alternative, processor can be any conventional processor, controller, microcontroller, or state machine. A processor can also be implemented as a combination of computing devices, for example, a combination of a DSP and a microprocessor, a plurality of microprocessors, one or more microprocessors in conjunction with a DSP core, or any other such configuration. Additionally, at least one processor can comprise one or more modules operable to perform one or more of the s and/or actions described herein.

For a software implementation, techniques described herein can be implemented with modules (e.g., procedures, functions, and so on) that perform functions described herein. Software codes can be stored in memory units and executed by processors. Memory unit can be implemented within processor or external to processor, in which case memory unit can be communicatively coupled to processor through various means as is known in the art. Further, at least one processor can include one or more modules operable to perform functions described herein.

Techniques described herein can be used for various wireless communication systems such as CDMA, TDMA, FDMA, OFDMA, SC-FDMA and other systems. The terms "system" and "network" are often used interchangeably. A CDMA system can implement a radio technology such as Universal Terrestrial Radio Access (UTRA), CDMA1800, etc. UTRA includes Wideband-CDMA (W-CDMA) and other variants of CDMA. Further, CDMA1800 covers IS-1800, IS-95 and IS-856 standards. A TDMA system can implement a radio technology such as Global System for Mobile Communications (GSM). An OFDMA system can implement a radio technology such as Evolved UTRA (E-UTRA), Ultra Mobile Broadband (UMB), IEEE 802.11 (Wi-Fi), IEEE 802.16 (WiMAX), IEEE 802.18, Flash-OFDML, etc. UTRA and E-UTRA are part of Universal Mobile Telecommunication System (UMTS). 3GPP Long Term Evolution (LTE) is a release of UMTS that uses E-UTRA, which employs OFDMA on downlink and SC-FDMA on uplink. UTRA, E-UTRA, UMTS, LTE and GSM are described in documents from an organization named "3rd Generation Partnership Project" (3GPP). Additionally, CDMA1800 and UMB are described in documents from an organization named "3rd Generation Partnership Project 2" (3GPP2). Further, such wireless communication systems can additionally include peer-to-peer (e.g., mobile-to-mobile) ad hoc network systems often using unpaired unlicensed spectrums, 802.xx wireless LAN, BLUETOOTH and any other short- or long-range, wireless communication techniques.

Single carrier frequency division multiple access (SC-FDMA), which utilizes single carrier modulation and frequency domain equalization is a technique that can be utilized with the disclosed aspects. SC-FDMA has similar performance and essentially a similar overall complexity as those of OFDMA system. SC-FDMA signal has lower peak-to-average power ratio (PAPR) because of its inherent single carrier structure. SC-FDMA can be utilized in uplink communications where lower PAPR can benefit a mobile terminal in terms of transmit power efficiency.

Moreover, various aspects or features described herein can be implemented as a method, apparatus, or article of manufacture using standard programming and/or engineering techniques. The term "article of manufacture" as used herein is intended to encompass a computer program accessible from any computer-readable device, carrier, or media. For example, computer-readable media can include but are not limited to magnetic storage devices (e.g., hard disk, floppy disk, magnetic strips, etc.), optical disks (e.g., compact disk (CD), digital versatile disk (DVD), etc.), smart cards, and flash memory devices (e.g., EPROM, card, stick, key drive, etc.). Additionally, various storage media described herein can represent one or more devices and/or other machine-readable media for storing information. The term "machine-readable medium" can include, without being limited to, wireless channels and various other media capable of storing, containing, and/or carrying instruction(s) and/or data. Additionally, a computer program product can include a computer readable medium having one or more instructions or codes operable to cause a computer to perform functions described herein.

Communications media embody computer-readable instructions, data structures, program modules or other structured or unstructured data in a data signal such as a modulated data signal, e.g., a carrier wave or other transport mechanism, and includes any information delivery or transport media. The term "modulated data signal" or signals refers to a signal that has one or more of its characteristics set or changed in such a manner as to encode information in one or more signals. By way of example, and not limitation, communication media include wired media, such as a wired network or direct-wired connection, and wireless media such as acoustic, RF, infrared and other wireless media.

Further, the actions of a method or algorithm described in connection with aspects disclosed herein can be embodied directly in hardware, in a software module executed by a processor, or a combination thereof. A software module can reside in RAM memory, flash memory, ROM memory, EPROM memory, EEPROM memory, registers, a hard disk, a removable disk, a CD-ROM, or any other form of storage medium known in the art. An exemplary storage medium can be coupled to processor, such that processor can read information from, and write information to, storage medium. In the alternative, storage medium can be integral to processor. Further, in some aspects, processor and storage medium can reside in an ASIC. Additionally, ASIC can reside in a user terminal. In the alternative, processor and storage medium can reside as discrete components in a user terminal. Additionally, in some aspects, the s and/or actions of a method or algorithm can reside as one or any combination or set of codes and/or instructions on a machine-readable medium and/or computer readable medium, which can be incorporated into a computer program product.

The above description of illustrated embodiments of the subject disclosure, including what is described in the Abstract, is not intended to be exhaustive or to limit the disclosed embodiments to the precise forms disclosed. While specific embodiments and examples are described herein for illustrative purposes, various modifications are possible that are considered within the scope of such embodiments and examples, as those skilled in the relevant art can recognize.

In this regard, while the disclosed subject matter has been described in connection with various embodiments and corresponding Figures, where applicable, it is to be understood that other similar embodiments can be used or modifications and additions can be made to the described embodiments for performing the same, similar, alternative, or substitute function of the disclosed subject matter without deviating therefrom. Therefore, the disclosed subject matter should not be limited to any single embodiment described herein, but rather should be construed in breadth and scope in accordance with the appended claims below.

In particular regard to the various functions performed by the above described components (assemblies, devices, circuits, systems, etc.), the terms (including a reference to a "means") used to describe such components are intended to correspond, unless otherwise indicated, to any component or structure which performs the specified function of the described component (e.g., that is functionally equivalent), even though not structurally equivalent to the disclosed structure which performs the function in the herein illustrated exemplary implementations of the disclosure. In addition, while a particular feature may have been disclosed with respect to only one of several implementations, such feature may be combined with one or more other features of the other implementations as may be desired and advantageous for any given or particular application.

What is claimed is:

1. An apparatus for a user equipment (UE) device communicatively coupled to a multi-radio heterogeneous network of a radio access network (RAN) comprising:

a memory that stores computer-executable components; and a processing circuitry, communicatively coupled to the memory, that facilitates execution of the computer-executable components, the computer-executable components including:

a control logic component comprising a network convergence protocol (NCP) layer component configured to generate packet data based on different radio access technologies, including a 5G millimeter wave RAT, by generating a NCP layer protocol data unit (PDU) in response to receiving a NCP layer service data unit (SDU) of a first RAT, and in response to receiving the NCP layer PDU generate the NCP layer SDU of the first RAT, generating another NCP layer PDU in response to a fallback operation and receiving another NCP layer SDU of a second RAT that is different from the first RAT from a network device, and generate the another NCP layer SDU of the second RAT in response to receiving the another NCP layer PDU and the fallback operation, wherein in response to the fallback operation the control logic component of the NCP layer controls one or more of: retransmissions, reordering processes, or duplicate elimination/discarding operations;

a transmit side logic component configured to provide the NCP layer PDU to a lower protocol layer in response to obtaining the NCP layer SDU from an upper protocol layer; and a receive side logic component configured to provide the NCP layer SDU to the upper protocol layer in response to obtaining the NCP layer PDU from the lower protocol layer.

2. The apparatus of claim 1, wherein the upper protocol layer comprises an Internet Protocol (IP) layer, and the lower protocol layer comprises a Packet Data Convergence Protocol (PDCP) layer.

3. The apparatus of claim 1, wherein the NCP layer component is further configured to control the fallback operation from an access node, in response to a blockage of the access node, to another access node as a first network device comprising a 5G access node, or to a second network device comprising a long term evolution (LTE) access node, while utilizing a same bearer.

4. The apparatus of claim 1, wherein the NCP layer component is further configured to reduce an interruption time during the fallback operation while utilizing a same bearer in the fallback operation without a bearer switching process from a first network device to a second network device, and communicate with the first network device and the second network device via different radio access technologies (RAT) in the multi-radio heterogeneous network of the RAN.

5. The apparatus of claim 1, further comprising an interface component configured to infer a sequence number from the lower protocol layer, or wherein the NCP layer component is further configured to transmit the sequence number in a NCP layer with at least one of the NCP layer SDU or the NCP layer PDU.

6. The apparatus of claim 1, further comprising:

a reordering component configured to generate a reordering process with NCP packets at a NCP layer in response to one or more of the NCP packets that are out-of-sequence or missing before a delivery of the NCP layer SDU to the upper protocol layer; and a duplication component configured to discard a duplicate NCP packet at the NCP layer before the delivery of the NCP layer SDU to the upper protocol layer.

7. The apparatus of claim 1, further comprising:
a status report component configured to generate a status report via a NCP layer as a NCP packet, wherein the status report comprises at least one of a NCP sequence number of a first missing NCP layer SDU (FMS) of a plurality of NCP layer SDUs, a bitmap indicating whether SDUs following the FMS of the plurality of NCP layer SDUs are successfully received, or a field of a NCP layer header indicating whether the NCP packet is a control NCP layer PDU or a data NCP layer PDU.

8. The apparatus of claim 1, further comprising:
one or more antenna ports;
one or more receivers, coupled to the one or more antenna ports and the receive side logic component, configured to receive the NCP layer PDU from the lower protocol layer or the NCP layer SDU from the upper protocol layer; and
one or more transmitters, coupled to the one or more antenna ports and the transmit side logic component, configured to provide the NCP layer SDU to the upper protocol layer or the NCP layer PDU from the lower protocol layer.

9. An apparatus for a base station (BS) communicatively coupled to a multi-radio heterogeneous network of a radio access network (RAN), comprising:
a memory that stores computer-executable components; and
a processing circuitry, communicatively coupled to the memory, that facilitates execution of the computer-executable components, the computer-executable components including:
a receive logic component configured to receive, from a first layer, a first data unit associated with a layer of a protocol stack comprising a network convergence protocol (NCP) layer;
a control logic component, communicatively coupled to the receive logic component, configured to generate a second data unit associated with the NCP layer based on the first data unit, the NCP layer of the protocol stack configured to control a fallback operation from a first access node, in response to a blockage of the first access node, to a second access node that is a different Radio Access Technology (RAT) than a RAT of the first access node, while utilizing a same bearer in the fallback operation, wherein in response to the fallback operation the control logic component of the NCP layer controls one or more of: retransmissions, reordering processes, or duplicate elimination/discarding operations and wherein the NCP layer is above a packet data convergence protocol (PDCP) layer of the protocol stack; and
a transmit logic component, communicatively coupled to the control logic component, configured to transmit the second data unit to a second layer and further configured to transmit, in the NCP layer, a sequence number and a status report configured to indicate one or more NCP packets that have been successfully received among a plurality of NCP packets, wherein the status report comprises a NCP sequence number of a first missing NCP SDU (FMS), and a bitmap indicating whether SDUs following the FMS are successfully received or not.

10. The apparatus of claim 9, wherein the first layer comprises an upper protocol layer comprising an internet protocol (IP) layer, the first data unit comprises a NCP service data unit (SDU), the second layer comprises a lower protocol layer comprises the PDCP layer, and the second data unit comprises a NCP protocol data unit (PDU), or wherein the first layer comprises the lower protocol layer comprising the PDCP layer, the first data unit comprises the NCP PDU, the second layer comprises the upper protocol layer comprising the IP layer, and the second data unit comprises the NCP SDU.

11. The apparatus of claim 9, wherein the control logic component is further configured to generate the second data unit based on a reordering process in response to an indication of a missing NCP packet or an out-of-order packet sequence.

12. The apparatus of claim 9, wherein the control logic component is further configured to provide a field in a header of the NCP layer that indicates whether an NCP PDU is a control NCP PDU or a data NCP PDU.

13. The apparatus of claim 9, wherein the control logic component is further configured to perform a duplicate discard prior to delivery of a NCP service data unit (SDU) to an upper protocol layer.

14. The apparatus of claim 9, wherein the control logic component is configured to generate a status report based on NCP packets that have been successively received in a sequence of NCP packets in response to a trigger event that comprises at least one of satisfying a predetermined number of the sequence of NCP packets being received, a period of time elapsing, an amount of packet data being received, or a radio resource control (RRC) signal from an upper protocol layer.

15. The apparatus of claim 9, wherein the control logic component is configured to generate a status report based on NCP packets that have been successively received in a sequence of NCP packets in response to a trigger event related to the fallback operation, wherein the trigger event comprises a disruption or blockage of a communication link.

16. The apparatus of claim 9, wherein the NCP layer is configured to control packet flow while utilizing the same bearer without a bearer switching process by enabling one or more retransmissions based on the fallback operation resulting from a blockage condition of a 5G mmW RAT communication.

17. A non-transitory computer-readable media comprising executable instructions that, in response to execution, cause a network device comprising one or more processors to perform operations in a multi-radio heterogeneous network of a radio access network (RAN), comprising:
receiving, by a receive logic component of the network device from a first layer, a first data unit associated with a layer of a protocol stack comprising a network convergence protocol (NCP) layer;
generating, by the one or more processors, a second data unit associated with the NCP layer based on the first data unit;
controlling packet communication, via the NCP layer of the protocol stack by the one or more processors, by utilizing a same bearer and without mapping a different bearer in response to a fallback operation from another network device that is communicatively coupled to the NCP layer on the multi-radio heterogeneous network of the RAN and that is a different Radio Access Technology (RAT) than a RAT of the network device, wherein in response to the fallback operation the operations further comprise one or more of:
retransmissions, reordering processes, or duplicate elimination/discarding operations and wherein the NCP layer is above a packet data convergence protocol (PDCP) layer of the protocol stack;

transmitting, by the network device to a second layer, the second data unit associated with the NCP layer; and transmitting, in the NCP layer, a sequence number and a status report configured to indicate one or more NCP packets that have been successfully received among a plurality of NCP packets, wherein the status report comprises a NCP sequence number of a first missing NCP service data unit (SDU), and a bitmap indicating whether SDUs following the first missing NCP SDU are successfully received or not.

18. The non-transitory computer-readable media of claim 17, wherein the first layer comprises an upper protocol layer, the first data unit comprises a NCP service data unit (SDU), the second layer comprises a lower protocol layer, and the second data unit comprises a NCP protocol data unit (PDU), or wherein the first layer comprises the lower protocol layer, the first data unit comprises the NCP PDU, the second layer comprises the upper protocol layer, and the second data unit comprises the NCP SDU.

19. The non-transitory computer-readable media of claim 18, wherein the upper protocol layer is an internet protocol (IP) layer, and the lower protocol layer is the PDCP layer.

20. The non-transitory computer-readable media of claim 18, wherein the operations further comprising:
generating, by the network device, the second data unit based on a reordering process.

21. The non-transitory computer-readable media of claim 18, wherein the operations further comprise:
transmitting, by the network device in the NCP layer, one or more of a sequence number or a status report, wherein the status report comprises a NCP sequence number of a first missing NCP SDU (FMS) and a bitmap indicating whether SDUs following the FMS have been successfully received.

22. The non-transitory computer-readable media of claim 18, wherein the operations further comprise:
performing a duplicate discard prior to a delivery of the NCP SDU to the upper protocol layer.

23. The non-transitory computer-readable media of claim 18, wherein the operations further comprise:
generating a status report based on NCP packets that have been successively received in a sequence of NCP packets in response to a trigger event related to the fallback operation.

* * * * *